United States Patent
Kang

(10) Patent No.: US 12,449,983 B2
(45) Date of Patent: Oct. 21, 2025

(54) MEMORY SYSTEM REDUCING STANDBY POWER AND METHOD FOR REDUCING STANDBY POWER THEREOF

(71) Applicant: SAMSUNG ELECTRONICS CO., LTD., Suwon-si (KR)

(72) Inventor: Sang-Kyu Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/398,283

(22) Filed: Dec. 28, 2023

(65) Prior Publication Data

US 2024/0393958 A1 Nov. 28, 2024

(30) Foreign Application Priority Data

May 26, 2023 (KR) .................. 10-2023-0068633

(51) Int. Cl.
G06F 3/06 (2006.01)
(52) U.S. Cl.
CPC .......... *G06F 3/0619* (2013.01); *G06F 3/0634* (2013.01); *G06F 3/0659* (2013.01); *G06F 3/0683* (2013.01)
(58) Field of Classification Search
CPC .... G06F 3/0619; G06F 3/0683; G06F 3/0659; G06F 3/0634
See application file for complete search history.

(56) References Cited

U.S. PATENT DOCUMENTS

| | | | |
|---|---|---|---|
| 7,293,183 B2 | 11/2007 | Lee et al. | |
| 8,274,501 B2 | 9/2012 | Kwa et al. | |
| 9,092,220 B2 | 7/2015 | Wyatt et al. | |
| 9,891,694 B2 | 2/2018 | Taha et al. | |
| 10,354,714 B2 | 7/2019 | Morgan | |
| 10,754,558 B2 | 8/2020 | Ishiguro et al. | |
| 11,507,175 B2 | 11/2022 | Golov | |
| 11,544,412 B2 | 1/2023 | Golov | |
| 2005/0055591 A1 | 3/2005 | Cho | |
| 2005/0283648 A1* | 12/2005 | Ashmore | G06F 1/3203 714/E11.138 |
| 2011/0219248 A1* | 9/2011 | Cho | G11C 11/40615 713/323 |
| 2011/0239043 A1* | 9/2011 | Vedder | G06F 1/3203 714/14 |
| 2017/0109081 A1* | 4/2017 | Iketaki | G06F 3/0659 |
| 2019/0155366 A1 | 5/2019 | Graf et al. | |
| 2021/0405892 A1* | 12/2021 | Bonen | G11C 11/40615 |
| 2023/0016888 A1 | 1/2023 | Golov | |
| 2023/0082061 A1* | 3/2023 | Hatori | G08G 1/166 340/435 |

\* cited by examiner

*Primary Examiner* — Mark A Giardino, Jr.
(74) *Attorney, Agent, or Firm* — Fish & Richardson P.C.

(57) ABSTRACT

A memory system is included in a host device. The memory system incudes: a volatile memory device that performs self-refresh until the host device turns on duty when detecting that the host device is off duty; a non-volatile memory device; and a processor that controls a read operation or a write operation of the volatile memory device and the nonvolatile memory device. The processor backs up data stored in the volatile memory device to the non-volatile memory device after a first time period elapses from when the host device is off duty. The volatile memory device stops the self-refresh after a second time period elapses from a time point when the data stored in the volatile memory device is backed up to the nonvolatile memory device.

20 Claims, 14 Drawing Sheets

MEMORY SYSTEM REDUCING STANDBY POWER AND METHOD FOR REDUCING STANDBY POWER THEREOF

CROSS-REFERENCE TO RELATED APPLICATIONS

Korean Patent Application No. 10-2023-0068633 filed on May 26, 2023, in the Korean Intellectual Property Office, and entitled "MEMORY SYSTEM REDUCING STANDBY POWER AND METHOD FOR REDUCING STANDBY POWER THEREOF," is incorporated by reference herein in its entirety.

BACKGROUND

1. Field

The present disclosure relates generally to a memory system, and more particularly, to a memory system that reduces standby power and a method for reducing the standby power thereof.

2. Description of Related Art

Semiconductor memory devices are classified into volatile memory devices and nonvolatile memory devices. Volatile memory devices, for example, a dynamic random access memory (DRAM) device and a static random access memory (SRAM) device, have high reading and writing speeds, but lose their stored data when their power supplies are interrupted. Meanwhile, nonvolatile memory devices may retain their stored data even when their power supplies are interrupted.

The volatile memory devices may be used in various host devices (for example, PCs, automobiles, or smart phones). Basically, when the host devices are turned off, data stored in the volatile memory devices may disappear. Meanwhile, there are cases in which the data stored in the volatile memory devices needs to be preserved even when the host devices are turned off. In this case, when the host devices are turned off, the volatile memory devices may continuously perform self-refresh to preserve the data. However, in order to continuously perform self-refresh, the volatile memory devices may use a specified self-refresh current even when the host devices are turned off, and therefore the host devices may consume power even when the host devices are turned off.

SUMMARY

Embodiments of the present disclosure provide a memory system and a method for reducing standby power thereof by reducing a self-refresh current of a volatile memory device when the host device is in a duty off state.

According to an embodiment, a memory system included in a host device includes: a volatile memory device configured to perform self-refresh until the host device turns on duty when detecting that the host device is off duty; a non-volatile memory device; and a processor configured to control a read operation or a write operation of the volatile memory device and the nonvolatile memory device. The processor backs up data stored in the volatile memory device to the non-volatile memory device after a first time period elapses from when the host device is off duty. The volatile memory device stops the self-refresh after a second time period elapses from a time point when the data stored in the volatile memory device is backed up to the nonvolatile memory device.

According to an embodiment, a method of reducing standby power of a memory system, included in a host device, includes: receiving a standby command when detecting the host device is off duty; counting a first time period based on the standby command; transmitting a flag when the first time period elapses; transmitting data stored in a volatile memory device which is included in the memory system based on a read command corresponding to the flag; counting a second time period from when a transmission of the data is completed; and powering off the volatile memory device after the second time period has elapsed.

According to an embodiment, a vehicle memory system included in a vehicle includes: a DRAM configured to perform self-refresh until the vehicle is turned on after a parking mode of the vehicle is detected; a NAND; and a system on chip configured to control a read operation or a write operation of the DRAM and the NAND. The system on chip backs up first data stored in the DRAM to the NAND after a first time period elapses from a time when the vehicle enters the parking mode. The DRAM stops the self-refresh after a second time period elapses from a time when the first data stored in the DRAM is backed up to the NAND.

Additional aspects will be set forth in part in the description which follows and, in part, will be apparent from the description, or may be learned by practice of the presented embodiments.

BRIEF DESCRIPTION OF THE DRAWINGS

Features will become apparent to those of skill in the art by describing in detail exemplary embodiments with reference to the attached drawings in which.

DETAILED DESCRIPTION

Below, example embodiments of the present disclosure will be described in detail and clearly to such an extent that an ordinary person in the art could easily implement the inventive concepts.

Below, a DRAM will be used as an example for illustrating features and functions of the present disclosure. However, other features and performances may be easily understood from information disclosed herein by a person of ordinary skill in the art. The present disclosure may be implemented by other embodiments or applied thereto. Furthermore, the detailed description may be modified or changed according to viewpoints and applications without escaping from the scope, spirit, and other objects of the present disclosure.

Figure 1:
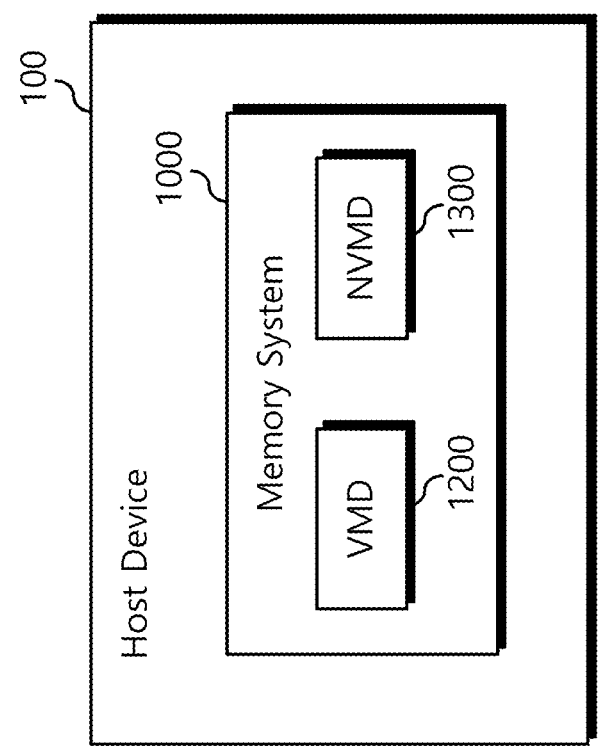
FIG. 1 is a block diagram illustrating a host device according to an example embodiment.

FIG. 1 is a block diagram illustrating a host device according to an example embodiment. Referring to FIG. 1, a host device 100 may include a memory system 1000. The memory system 1000 may store data for driving the host device 100. The memory system 1000 may include a volatile memory device 1200 and a nonvolatile memory device 1300.

According to an example embodiment, the volatile memory device 1200 may have high reading and writing speeds, but contents stored in the volatile memory device 1200 may disappear when a power supply is interrupted. Contents stored in the nonvolatile memory device 1300 may be preserved even when the power supply is interrupted. For example, the memory system 1000 may store main data in the nonvolatile memory device 1300. The memory system 1000 may load data necessary for an operation of the host device 100 into the volatile memory device 1200. The loaded data may be used for the operation of the host device 100. The memory system 1000 may back up data used for the operation of the host device 100 from the volatile memory device 1200 to the nonvolatile memory device 1300.

According to an example embodiment, the memory system 1000 may maintain data in the volatile memory device 1200 even when the host device 100 is stopped. For example, when the host device 100 stops, the volatile memory device 1200 may enter a self-refresh mode and continuously perform self-refresh. If the self-refresh is continuously performed even while the host device 100 is stopped, data stored in the volatile memory device 1200 may be maintained. However, if the self-refresh is continuously performed, power consumption of the host device 100 may continue even while the host device 100 is stopped.

According to an example embodiment, the memory system 1000 may reduce power consumption due to continuous self-refresh. For example, the memory system 1000 may transmit data stored in the volatile memory device 1200 to the nonvolatile memory device 1300 and stop self-refresh when a specified condition is satisfied after the host device 100 has stopped. In addition, the memory system 1000 may restore the data stored in the nonvolatile memory device 1300 to the volatile memory device 1200 when the host device 100 is driven so that the volatile memory device 1200 may return to a state prior to self-refresh being stopped. Accordingly, the user of the host device 100 may use the host device 100 in the same state as before the host device 100 stopped.

Figure 2:
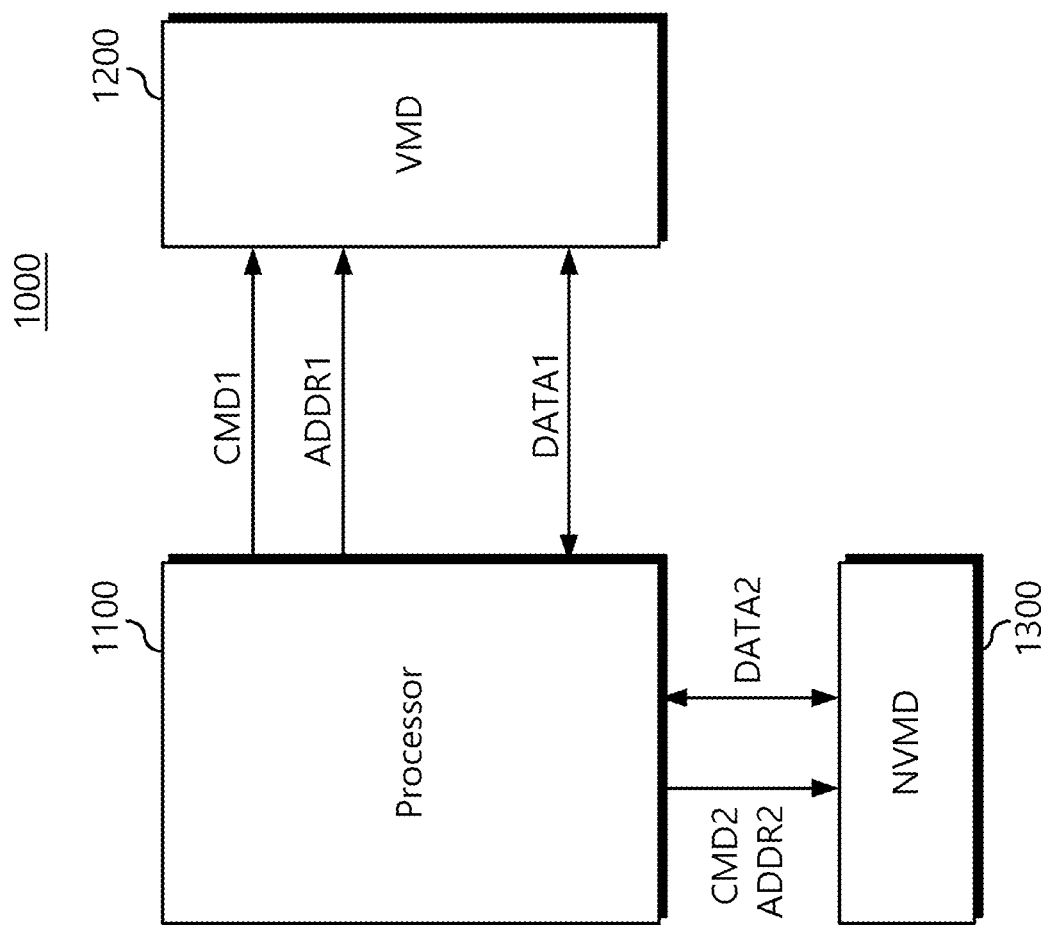
FIG. 2 is a block diagram illustrating a memory system of FIG. 1.

FIG. 2 is a block diagram illustrating a memory system 1000 of FIG. 1. Referring to FIG. 2, a memory system 1000 may include a processor 1100, a volatile memory device 1200, and a nonvolatile memory device 1300.

According to an example embodiment, the processor 1100 may write data to the volatile memory device 1200 or the nonvolatile memory device 1300. The processor 1100 may also perform access operations to read data stored in the volatile memory device 1200 or the nonvolatile memory device 1300. For example, the processor 1100 may generate a first command CMD1 and a first address ADDR1 for writing data into the volatile memory device 1200 or reading data stored in the volatile memory device 1200. In addition, the processor 1100 may generate a second command CMD2 and a second address ADDR2 for writing data into the nonvolatile memory device 1300 or reading data stored in the nonvolatile memory device 1300. The processor 1100 may include at least one of a memory controller for controlling the volatile memory device 1200 or the nonvolatile memory device 1300, a system on chip (SoC) such as an application processor (AP), a central processing unit (CPU), a digital signal processor (DSP), and a graphics processing unit (GPU).

According to an example embodiment, the processor 1100 may provide various signals to the volatile memory device 1200 or the nonvolatile memory device 1300 to control the overall operation of the volatile memory device 1200 or the nonvolatile memory device 1300. For example, the processor 1100 may control memory access operations of the volatile memory device 1200 or the nonvolatile memory device 1300, such as a read operation and a write operation. The processor 1100 may provide the first command CMD1 and the first address ADDR1 to the volatile memory device 1200 to write first data DATA1 into the volatile memory device 1200, or to read first data DATA1 from the volatile memory device 1200. The processor 1100 may provide the second command CMD2 and the second address ADDR2 to the nonvolatile memory device 1300 to write second data DATA2 into the nonvolatile memory device 1300, or to read second data DATA2 from the nonvolatile memory device 1300.

According to an example embodiment, the processor 1100 may generate various types of the first command CMD1 to control the volatile memory device 1200. For example, the processor 1100 may generate a bank request corresponding to a bank operation of changing a state of a memory bank, among memory banks, to read or write first data DATA1. As an example, the bank request may include an active request for changing a state of a memory bank, among the memory banks, to an active state. The volatile memory device 1200 may activate a row included in the memory banks, for example, a word line, in response to the activation request. The bank request may include a precharge request for changing the memory banks from an active state to a standby mode after reading or writing of first data DATA1 is completed. In addition, the processor 1100 may generate an input/output (I/O) request (for example, a column address strobe (CAS) request) for the volatile memory device 1200 to perform a read operation or a write operation of first data DATA1. As an example, the I/O request may include a read request for reading first data DATA1 from activated memory banks. The I/O request may include a write request for writing first data DATA1 in the activated memory banks. The processor 1100 may generate a refresh command to control a refresh operation on the memory banks. However, the types of first command CMD1 described herein are merely exemplary, and other types of first command CMD1 may be present.

According to an example embodiment, the volatile memory device 1200 may output first data DATA1, requested to be read by the processor 1100, to the processor 1100 or may store first data DATA1, requested to be written by the processor 1100, in the memory cell. The volatile memory device 1200 may input and output first data DATA1 based on the first command CMD1 and the first address ADDR1. The volatile memory device 1200 may include memory banks.

The volatile memory device 1200 may be a volatile memory device such as a dynamic random access memory (DRAM), a synchronous dynamic random access memory (SDRAM), a double data rate (DDR) DRAM, a DDR SDRAM, a low-power double data rate (LPDDR) SDRAM, a graphics double data rate (GDDR) SDRAM, a Rambus dynamic random access memory (RDRAM), a static random access memory (SRAM), or the like. In the present specification, the advantages of the present disclosure have been described with respect to a DRAM, but example embodiments are not limited thereto.

According to an example embodiment, the memory banks may include a memory cell array divided in units of banks, a row decoder, a column decoder, a sense amplifier, a write driver, or the like. The memory banks may store first data DATA1, requested to be written in the memory device 1200, through the write driver and may read first data DATA1, requested to be read, using the sense amplifier. The memory banks may further include a component for a refresh operation of storing and maintaining data in the cell array, or select circuits based on an address.

According to an example embodiment, the nonvolatile memory device 1300 may include components for storing or reading second data DATA2. For example, the nonvolatile memory device 1300 may include a memory cell array, an address decoder, a page buffer circuit, a data input/output circuit, a voltage generator, and control logic. The memory cell array may include a plurality of memory blocks BLK1 to BLKn storing data. The address decoder may be connected to the memory cell array through a selection line and word lines. The address decoder may select a word line during a program operation or a read operation. The address decoder may receive a word line voltage from a voltage generator and provide a program voltage or a read voltage to a selected word line. The page buffer circuit may be connected to the memory cell array through bitlines. The page buffer circuit may temporarily store data to be stored in the memory cell array or data read from the memory cell array. The page buffer circuit may include a page buffer connected to each bitline. The data input/output circuit may be internally connected to the page buffer circuit and externally connected to the processor 1100 through data lines. The control logic may control operations such as a program, a read, and an erase of the nonvolatile memory device 1100 using the second command CMD2 and the second address ADDR2 provided from the processor 1100. The second address ADDR2 may include a block selection address for selecting one memory block, and a row address and column address for selecting one memory cell.

According to an example embodiment, the nonvolatile memory device 1300 may be implemented as a memory device such as a flash memory, a resistive RAM (RRAM), a phase change memory (PRAM), a magnetoresistive memory (MRAM), a ferroelectric memory (FRAM), a spin-transfer torque RAM (STT-RAM), or the like. In the present specification, the advantages of the present disclosure have been described with respect to the flash memory, but example embodiments are not limited thereto.

Figure 3:
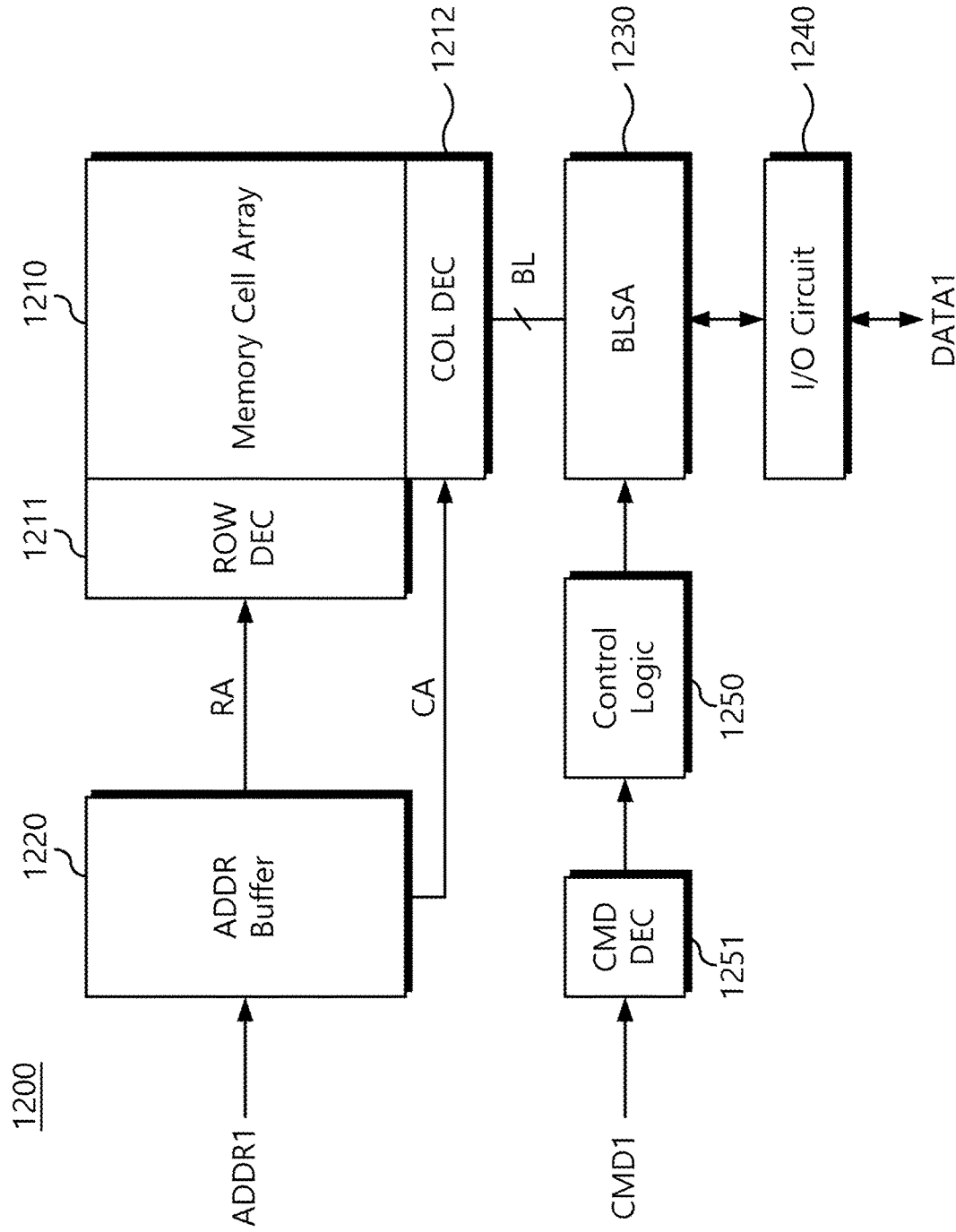
FIG. 3 is a block diagram illustrating a volatile memory device of FIG. 2.

FIG. 3 is a block diagram illustrating a volatile memory device 1200 of FIG. 2. Referring to FIG. 3, a volatile memory device 1200 may include a memory cell array 1210, a row decoder 1211, a column decoder 1212, an address buffer 1220, a bitline sense amplifier 1230, and an input/output circuit 1240, a command decoder 1251, and a control logic 1250.

According to an example embodiment, the memory cell array 1210 may include a plurality of memory cells arranged in a matrix of rows and columns. For example, the memory cell array 1210 may include a plurality of wordlines and a plurality of bitlines BL connected to memory cells. The plurality of wordlines may be connected to rows of the memory cells, and the plurality of bitlines BL may be connected to columns of the memory cells.

According to an example embodiment, the address buffer 1220 may receive a first address ADDR1 from the processor 1100 of FIG. 2. For example, the first address ADDR1 may include a row address RA addressing a row of the memory cell array 1210 and a column address CA addressing a column of the memory cell array 1210. The address buffer 1220 may transmit the row address RA to the row decoder 1211 and may transmit the column address CA to the column decoder 1212.

According to an example embodiment, the row decoder 1211 may select one of the plurality of wordlines connected to the memory cell array 1210. The row decoder 1211 may decode the row address RA, received from the address buffer 1220, to select a single wordline corresponding to the row address RA and may activate the selected wordline.

According to an example embodiment, the column decoder 1212 may select a predetermined bitline from among the plurality of bitlines BL of the memory cell array 1210. The column decoder 1212 may decode the column address CA, received from the address buffer 1220, to select the predetermined bitline BL corresponding to the column address CA.

According to an example embodiment, the bitline sense amplifier 1230 may be connected to the bitlines BL of the memory cell array 1210. For example, the bitline sense amplifier 1230 may sense a change in voltage of a selected bitline, among the plurality of bitlines BL, and may amplify and output the change in voltage. The input/output circuit 1240 may output first data DATA1 to the processor 1100 through data lines based on a sensed and amplified voltage from the bitline sense amplifier 1230.

According to an example embodiment, the command decoder 1251 may decode a write enable signal /WE, a row address strobe signal /RAS, a column address strobe signal /CAS, and a chip select signal /CS received from the processor 1100 such that control signals corresponding to the first command CMD1 are generated in the control logic 1250. The first command CMD1 may include an active request, a read request, a write request, or a precharge request. The control logic 1250 may control an overall operation of the bitline sense amplifier 1230 through the control signals corresponding to the first command CMD1.

Figure 4:
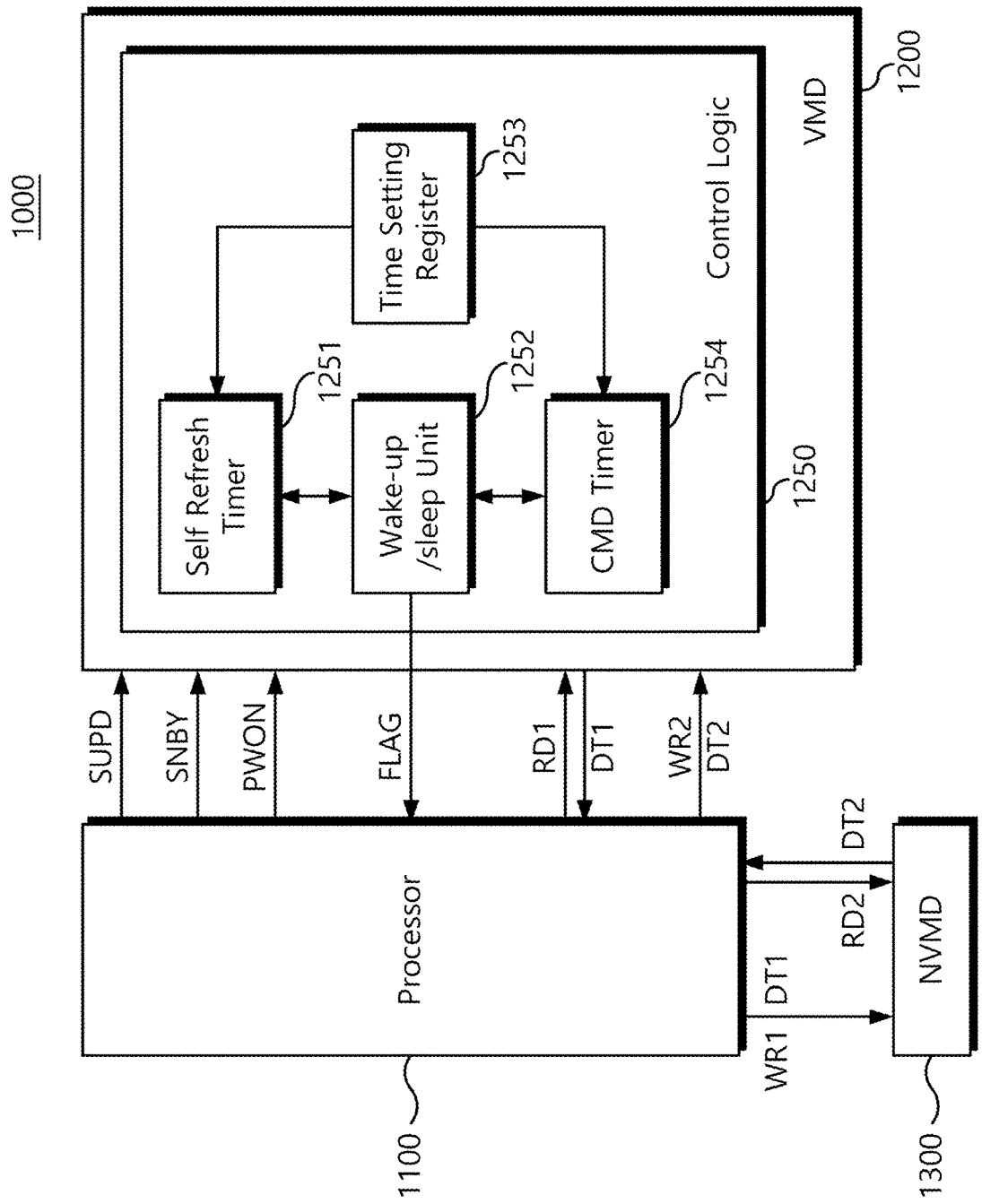
FIG. 4 is a block diagram illustrating the memory system 1000 of FIG. 2 as it is used in a standby power reduction operation.

FIG. 4 is a block diagram illustrating the memory system 1000 of FIG. 2 as it is used in a standby power reduction operation. Referring to FIG. 4, the memory system 1000 may reduce standby power of the host device 100 of FIG. 1 by reducing a self-refresh time of the volatile memory device 1200 during a stop of the host device 100. The control logic 1250 of the volatile memory device 1200 may include a self-refresh timer 1251, a wake-up/sleep unit 1252, a time setting register 1253, and a command timer 1254.

According to an example embodiment, when receiving the standby command SUPD, the volatile memory device 1200 may enter a self-refresh mode. For example, when the host device 100 stops (for example, a power off, a temporary stop, an idle period, or the like), the processor 1100 may transmit a standby command SUPD to the volatile memory device 1200. When receiving the standby command SUPD, the volatile memory device 1200 may enter the self-refresh mode. As an example, when receiving the standby command SUPD, the wake-up/sleep unit 1252 may cause the volatile memory device 1200 to operate in the self-refresh mode and send a first timer start signal to the self-refresh timer 1251. In the self-refresh mode, the volatile memory device 1200 may periodically perform self-refresh.

According to an example embodiment, when receiving the standby command SUPD, the volatile memory device 1200 may count a specified time. For example, when receiving the standby command SUPD, the self-refresh timer 1251 may count a first time period. The time setting register 1253 may store the first time period. The first time period may be set by a user. The self-refresh timer 1251 may start counting when receiving information of the first time period from the time setting register 1253.

According to an example embodiment, when the first time period elapses, the volatile memory device 1200 may enter a standby mode. For example, the self-refresh timer 1251 may transmit a first time-elapsed signal to the wake-up/sleep unit 1252 when the first time period elapses. When receiving the first time-elapsed signal, the wake-up/sleep unit 1252 may enter the standby mode capable of receiving a command from the processor 1100. In addition, when receiving the first time-elapsed signal, the wake-up/sleep unit 1252 may transmit a flag FLAG to the processor 1100.

According to an example embodiment, when the processor 1100 receives the flag FLAG, the memory system 1000 may back up data stored in the volatile memory device 1200 to the nonvolatile memory device 1300. For example, when receiving the flag FLAG, the processor 1100 may transmit a first read command RD1 to the volatile memory device 1200. As an example, the first read command RD1 may include at least one read command based on a size of the data stored in the volatile memory device 1200. The volatile memory device 1200 may transmit first data DT1 to the processor 1100 in response to the first read command RD1. The processor 1100 may transmit a first write command WR1 together with the first data DT1 to the nonvolatile memory device 1300.

According to an example embodiment, when backing up the first data DT1, the volatile memory device 1200 may count a specified time. For example, when no more commands are received from the processor 1100, the command timer 1254 may count a second time period. As an example, the command timer 1254 may count the second time period from a time point at which a transmission of the first data DT1 is completed. As another example, the command timer 1254 may count the second time period from a reception point of the first read command RD1. When the first read command RD1 includes a plurality of read commands, the command timer 1254 may count a second time period from a reception point of the last read command. The time setting register 1253 may store a second time period. The second time period may be set by a user. The command timer 1254 may start counting when receiving the second time period from the time setting register 1253.

According to an example embodiment, when the second time period elapses, the volatile memory device 1200 may enter a power-off mode. For example, the command timer 1254 may transmit a second time-elapsed signal to the wake-up/sleep unit 1252 when the second time period elapses. When receiving the second time-elapsed signal, the wake-up/sleep unit 1252 may cut off power to the volatile memory device 1200. In the power-off mode, the volatile memory device 1200 may not even perform a self-refresh operation. Accordingly, a current (for example, IDD6) consumed for the self-refresh operation is reduced (i.e., stopped), and standby power of the host device 100 may be reduced during a stop period of the host device 100.

According to an example embodiment, when a specified condition is satisfied, the memory system 1000 may change the volatile memory device 1200 from the power-off mode to the standby mode. For example, when an operation of the host device 100 is detected, the processor 1100 may transmit a standby command SNBY to the volatile memory device 1200. When the standby command SNBY is received, the wake-up/sleep unit 1252 may enter the standby mode capable of receiving a command from the processor 1100.

According to an example embodiment, the memory system 1000 may restore data of the volatile memory device 1200 to a state prior to the power-off mode. For example, the processor 1100 may transmit a second read command RD2 to the nonvolatile memory device 1300. The nonvolatile memory device 1300 may transmit second data DT2 to the processor 1100 in response to the second read command RD2. As an example, the second data DT2 may be identical to the first data DT1. Alternatively, the second data DT2 may include the first data DT1. The processor 1100 may transmit a second write command WR2 together with the second data DT2 to the volatile memory device 1200. The volatile memory device 1200 may store the second data DT2 and restore the state prior to the power-off mode.

According to an example embodiment, when power of the host device 100 is turned on, the memory system 1000 may activate the volatile memory device 1200. For example, when the power of the host device 100 is turned on, the volatile memory device 1200 may enter an operating mode. Since data prior to the power-off mode is restored in the volatile memory device 1200, a user of the host device 100 may use the host device 100 without delay.

Figure 5:
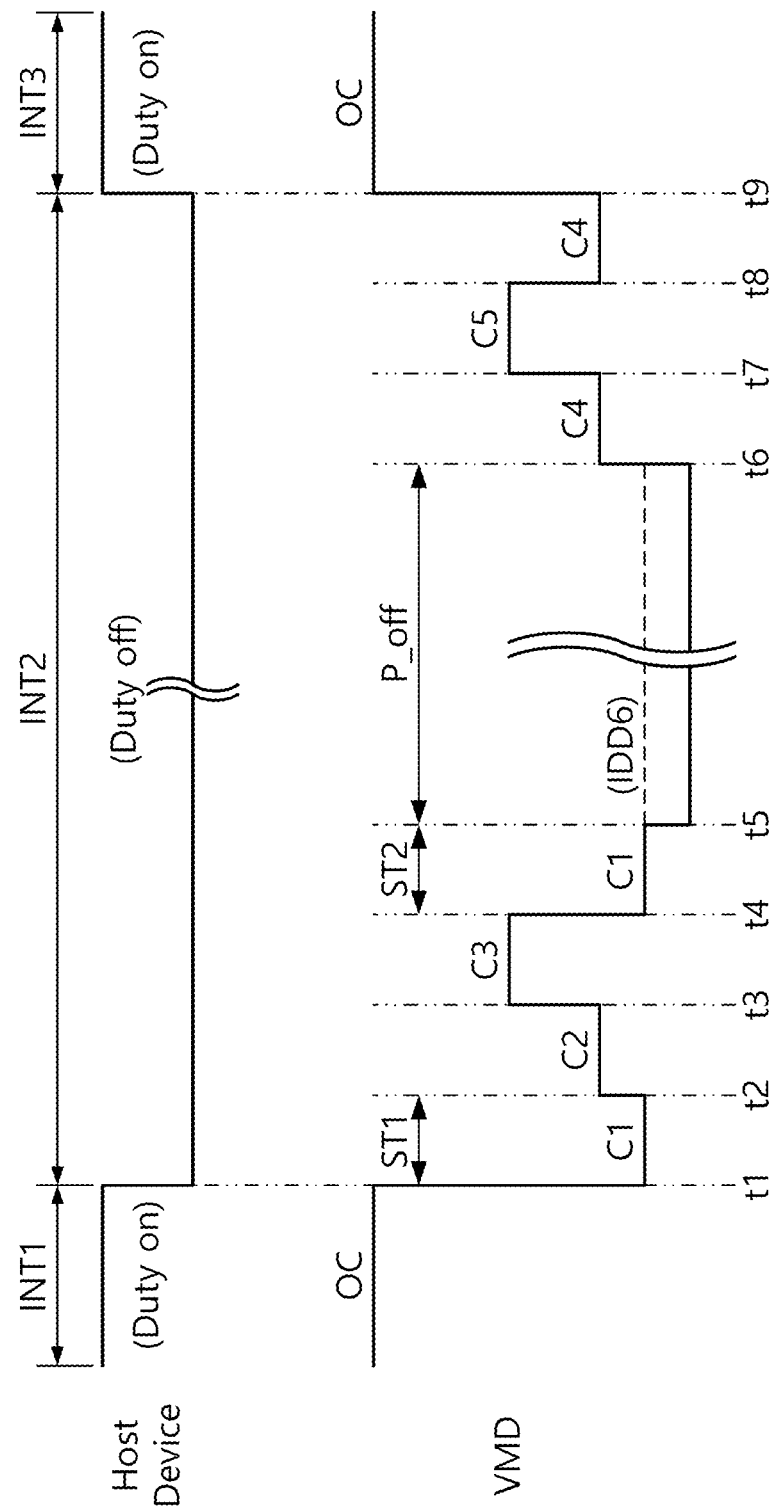
FIG. 5 is a timing diagram illustrating changes in current used in the volatile memory device of FIG. 4.

FIG. 5 is a timing diagram illustrating changes in current used in the volatile memory device of FIG. 4.

Referring to FIGS. 4 and 5, when the host device 100 is off duty (for example, in a duty off state), the volatile memory device 1200 may reduce a current used for a self-refresh operation, and standby power of the host device 100 may accordingly be saved. In a first period INT1 and a third period INT3 (for example, a period in which the host device 100 is used, or when the host device 100 is on duty), operating current OC may be consumed on the volatile memory device 1200. In a second period INT2 (for example, a period in which the host device 100 is stopped or a case in which the host device 100 is in the duty off state), standby currents C1, C2, C3, C4, C5 may be consumed on the volatile memory device 1200.

According to an example embodiment, at a first time point t1, a state of the host device 100 may be changed from duty on to duty off. For example, in the duty off state, the processor 1100 may transmit a standby command SUPD to the volatile memory device 1200. When receiving the standby command SUPD, the volatile memory device 1200 may enter a self-refresh mode. In the self-refresh mode, the volatile memory device 1200 may consume the first standby current C1 (for example, IDD6). The self-refresh timer 1251 may count a first time period ST1.

According to an example embodiment, at a second time point t2, the volatile memory device 1200 may enter a standby mode. For example, the self-refresh timer 1251 may transmit a first time-elapsed signal to the wake-up/sleep unit 1252 when the first time period ST1 elapses. When receiving the first time-elapsed signal, the wake-up/sleep unit 1252 may enter the standby mode capable of receiving a command from the processor 1100. In the standby mode, the volatile memory device 1200 may consume the second standby current C2. In addition, when receiving the first time-elapsed signal, the wake-up/sleep unit 1252 may transmit a flag FLAG to the processor 1100.

According to an example embodiment, at a third time point t3, the memory system 1000 may back up data stored in the volatile memory device 1200 to the nonvolatile memory device 1300. For example, when receiving the flag FLAG, the processor 1100 may transmit a first read command RD1 to the volatile memory device 1200. The volatile memory device 1200 may transmit first data DT1 to the processor 1100 in response to the first read command RD1. When the first data DT1 is transmitted to the processor 1100 in response to the first read command RD1, the volatile memory device 1200 may consume the third standby current C3.

According to an example embodiment, at a fourth point in time t4, the volatile memory device 1200 may count a specified time. For example, when no more commands are received from the processor 1100, the command timer 1254 may count a second time period ST2. For example, the command timer 1254 may count a second time period ST2 from a point at which a transmission of the first data DT1 is completed. As another example, the command timer 1254 may count a second time period ST2 from a reception point of the first read command RD1. When the first read command RD1 includes a plurality of read commands, the command timer 1254 may count a second time period ST2 from a reception point of the last read command. And then, by entering the self-refresh mode again, the volatile memory device 1200 may consume the first standby current C1 (for example, IDD6).

According to an example embodiment, at a fifth time point t5, the volatile memory device 1200 may enter a power-off mode. For example, the command timer 1254 may transmit a second time-elapsed signal to the wake-up/sleep unit 1252 when the second time period ST2 elapses. When receiving the second time-elapsed signal, the wake-up/sleep unit 1252 may cut off power to the volatile memory device 1200. During the power-off period P_off, the volatile memory device 1200 may not even perform the self-refresh operation. Accordingly, the current (for example, IDD6) consumed for the self-refresh operation is reduced, and standby power of the host device 100 may be reduced during the duty off state of the host device 100.

According to an example embodiment, at a sixth time point t6, when a specified condition is satisfied, the memory system 1000 may change the volatile memory device 1200 from the power-off mode to the standby mode. For example, when an operation of the host device 100 is detected, the processor 1100 may transmit a standby command SNBY to the volatile memory device 1200. When the standby command SNBY is received, the wake-up/sleep unit 1252 may enter the standby mode capable of receiving a command from the processor 1100. In the standby mode, the volatile memory device 1200 may consume the fourth standby current C4. As an example, the fourth standby current C4 may be equal to the second standby current C2. As another example, the fourth standby current C4 may be different from the second standby current C2.

According to an example embodiment, at a seventh point in time t7, data of the volatile memory device 1200 may be restored. For example, the processor 1100 may transmit a second read command RD2 to the nonvolatile memory device 1300. The nonvolatile memory device 1300 may transmit a second data DT2 to the processor 1100 in response to the second read command RD2. As an example, the second data DT2 may be identical to the first data DT1. Alternatively, the second data DT2 may include the first data DT1. The processor 1100 may transmit a second write command WR2 together with the second data DT2 to the volatile memory device 1200. The volatile memory device 1200 may perform a write operation of the second data DT2 and restore a state prior to the power-off mode. When performing the write operation of the second data DT2, the volatile memory device 1200 may consume the fifth standby current C5.

According to an example embodiment, at an eighth point in time t8, when the write operation of the second data DT2 is completed, the volatile memory device 1200 may be maintained in the standby mode. For example, while the standby mode is maintained, the volatile memory device 1200 may consume the fourth standby current C4.

According to an example embodiment, at a ninth time point t9, when the power of the host device 100 is turned on, the memory system 1000 may activate the volatile memory device 1200. For example, when the power of the host device 100 is turned on, the volatile memory device 1200 may enter an operating mode. Since data prior to the power-off mode is restored in the volatile memory device 1200, the user of the host device 100 may use the host device 100 without delay. In the operating mode, the volatile memory device 1200 may consume operating current OC.

Figure 6:
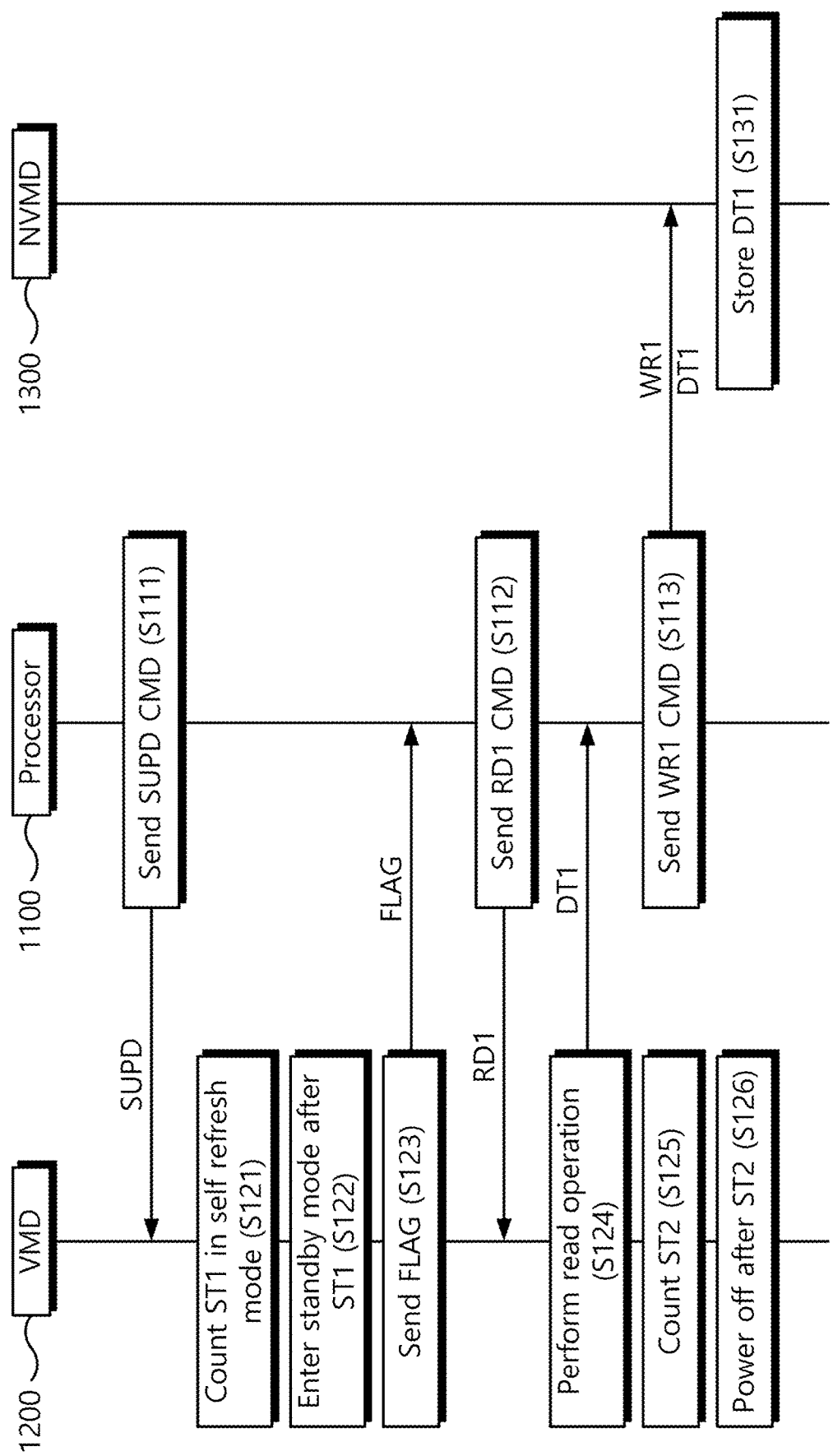
FIG. 6 is a flowchart illustrating a data backup operation according to a standby power reduction method of the memory system of FIG. 4.

FIG. 6 is a flowchart illustrating a data backup operation according to a standby power reduction method of the memory system of FIG. 4. Referring to FIGS. 4 to 6, the memory system 1000 may reduce a self-refresh time of the volatile memory device 1200 when the host device 100 of FIG. 1 is stopped to reduce standby power of the host device 100.

According to an example embodiment, in operation S111, the processor 1100 may transmit a standby command SUPD to the volatile memory device 1200. For example, when the host device 100 stops (for example, duty off, power off, a temporary stop, an idle period, or the like), the processor 1100 may transmit the standby command SUPD to the volatile memory device 1200.

According to an example embodiment, in operation S121, the volatile memory device 1200 may count a first time period ST1 in a self-refresh mode. For example, when receiving the standby command SUPD, the volatile memory device 1200 may enter the self-refresh mode. As an example, when receiving the standby command SUPD, the wake-up/sleep unit 1252 may cause the volatile memory device 1200 to operate in the self-refresh mode and send a first timer start signal to a self-refresh timer 1251. In the self-refresh mode, the volatile memory device 1200 may periodically perform self-refresh. When receiving the first timer start signal, the self-refresh timer 1251 may count the first time period ST1.

According to an example embodiment, in operation S122, when the first time period ST1 elapses, the volatile memory device 1200 may enter a standby mode. For example, the self-refresh timer 1251 may transmit a first time-elapsed signal to the wake-up/sleep unit 1252 when the first time period ST1 elapses. When receiving the first time-elapsed signal, the wake-up/sleep unit 1252 may enter a standby mode capable of receiving a command from the processor 1100.

According to an example embodiment, in operation S123, when the first time period ST1 elapses, the volatile memory device 1200 may transmit a flag FLAG to the processor 1100. For example, when receiving the first time-elapsed signal, the wake-up/sleep unit 1252 may transmit the flag FLAG to the processor 1100.

According to an example embodiment, in operation S112, when receiving the flag FLAG, the processor 1100 may transmit a first read command RD1 to the volatile memory device 1200. For example, the first read command RD1 may include at least one read command based on a size of data stored in the volatile memory device 1200.

According to an example embodiment, in operation S124, the volatile memory device 1200 may perform a read operation based on the first read command RD1. For example, the volatile memory device 1200 may transmit first data DT1 to the processor 1100 in response to the first read command RD1.

According to an example embodiment, in operation S125, the volatile memory device 1200 may count a second time period ST2. For example, when no more commands are received from the processor 1100, the command timer 1254 may count the second time period ST2. As an example, the command timer 1254 may count the second time period ST2 from a point at which a transmission of the first data DT1 is completed. As another example, the command timer 1254 may count the second time period ST2 from a time point at which the first read command RD1 is received. When the first read command RD1 includes a plurality of read commands, the command timer 1254 may count the second time period ST2 from a reception point of the last read command.

According to an example embodiment, in operation S126, when the second time period ST2 elapses, the volatile memory device 1200 may enter a power-off mode. For example, the command timer 1254 may transmit a second time-elapsed signal to the wake-up/sleep unit 1252 when the second time period ST2 elapses. When receiving the second time-elapsed signal, the wake-up/sleep unit 1252 may cut off power to the volatile memory device 1200. In the power-off mode, the volatile memory device 1200 may not even perform a self-refresh operation. Accordingly, a current (for example, IDD6) consumed for the self-refresh operation is reduced, and standby power of the host device 100 may be reduced during the duty off state of the host device 100.

According to an example embodiment, in operation S113, the processor 1100 may transmit a first write command WR1 together with the first data DT1 to the nonvolatile memory device 1300.

According to an example embodiment, in operation S131, the nonvolatile memory device 1300 may store the first data DT1. For example, the nonvolatile memory device 1300 may perform a write operation of the first data DT1. The write operation of the first data DT1 may be performed regardless of an operation of the volatile memory device 1200.

Figure 7:
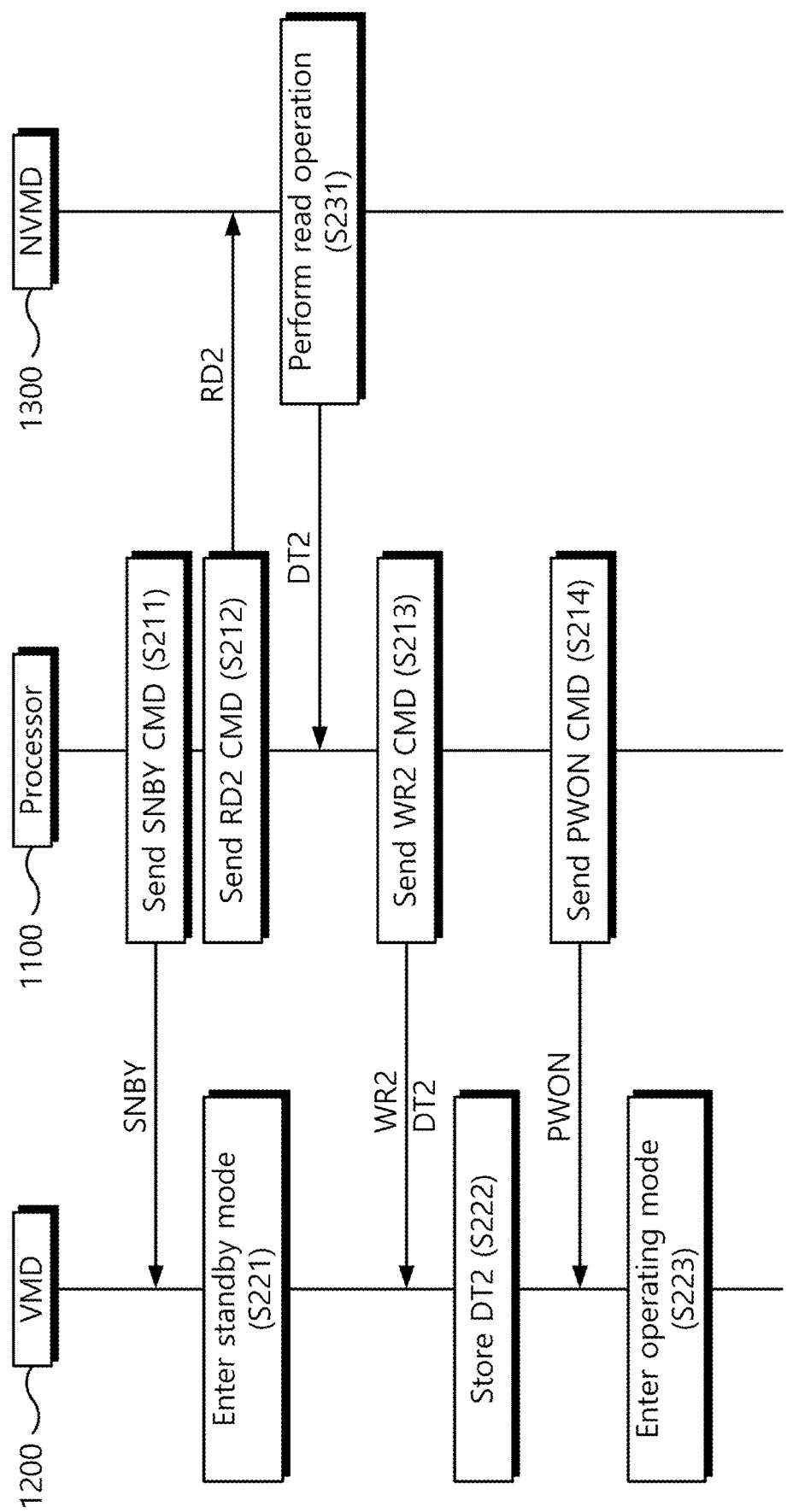
FIG. 7 is a flowchart illustrating a data recovery operation according to the standby power reduction method of the memory system of FIG. 4.

FIG. 7 is a flowchart illustrating a data recovery operation according to the standby power reduction method of the memory system of FIG. 4. Referring to FIGS. 4 to 7, the memory system 1000 may restore data of the volatile memory device 1200 when the host device 100 of FIG. 1 restarts to shorten a delay during a re-operation of the host device 100.

According to an example embodiment, in operation S211, when a specified condition is satisfied, the processor 1100 may transmit a standby command SNBY to the volatile memory device 1200. For example, when an operation of the host device 100 is detected, the processor 1100 may transmit the standby command SNBY.

According to an example embodiment, in operation S221, the volatile memory device 1200 may enter a standby mode. For example, when the standby command SNBY is received, the wake-up/sleep unit 1252 may enter the volatile memory device 1200 into the standby mode capable of receiving a command from the processor 1100.

According to an example embodiment, in operation S212, the processor 1100 may transmit a second read command RD2 to the nonvolatile memory device 1300. In operation S231, the nonvolatile memory device 1300 may transmit second data DT2 to the processor 1100 in response to the second read command RD2.

According to an example embodiment, in operation S213, the processor 1100 may transmit a second write command WR2 together with the second data DT2 to the volatile memory device 1200. In operation S222, the volatile memory device 1200 may store the second data DT2. Accordingly, the volatile memory device 1200 may be restored to a state prior to the power-off mode. The volatile memory device 1200 may stand by in a standby mode.

According to an example embodiment, in operation S214, when the host device 100 is turned on (for example, a duty on, a power on, an operation start, or the like), the processor 1100 may transmit a power-on command PWON to the volatile memory device 1200. In operation S223, when receiving the power-on command PWON, the volatile memory device 1200 may enter an operation mode. In the volatile memory device 1200, data prior to the power-off mode is restored in operation S222, so that a user of the host device 100 may use the host device 100 without delay.

Figure 8:
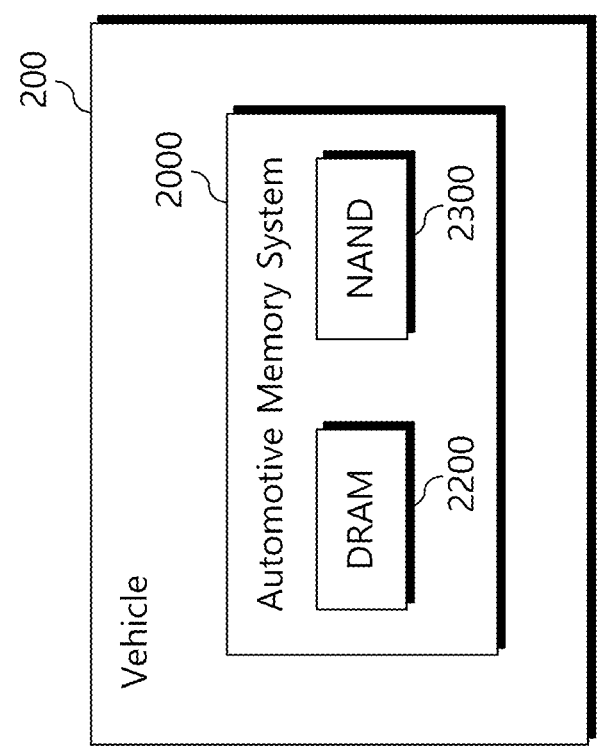
FIG. 8 is a block diagram illustrating a vehicle according to an example embodiment.

FIG. 8 is a block diagram illustrating a vehicle according to an example embodiment. Referring to FIG. 8, a vehicle 200 may include a vehicle memory system 2000. The vehicle memory system 2000 may store data for driving the vehicle 200. The vehicle memory system 2000 may include a DRAM 2200 and a NAND 2300.

According to an example embodiment, the DRAM 2200 may have high reading and writing speeds, but lose data stored in the DRAM 2200 when power supply is interrupted. Contents of the NAND 2300 may be preserved even when power supply is interrupted. For example, the vehicle memory system 2000 may store main data in the NAND 2300. The vehicle memory system 2000 may load data necessary for an operation of the vehicle 200 into the DRAM 2200. The loaded data may be used for the operation of the vehicle 200. The vehicle memory system 2000 may back up data used for the operation of the vehicle 200 from the DRAM 2200 to the NAND 2300.

According to an example embodiment, the vehicle memory system 2000 may maintain data of the DRAM 2200 even when the engine of the vehicle 200 is turned off (hereinafter referred to as a parking mode). For example, when the vehicle 200 is in the parking mode, the DRAM 2200 may enter a self-refresh mode and continuously perform self-refresh. If self-refresh is continuously performed even during the parking mode of the vehicle 200, data stored in the DRAM 2200 may be maintained. However, if the self-refresh is continuously performed, power consumption of the vehicle 200 may continue even while in the parking mode of the vehicle 200.

According to an example embodiment, the vehicle memory system 2000 may reduce power consumption caused by continuous self-refresh. For example, the vehicle memory system 2000 may transmit data stored in the DRAM 2200 to the NAND 2300 and stop self-refresh when a specified condition is satisfied after the vehicle 200 enters a parking mode. In addition, the vehicle memory system 2000 may restore the data stored in the NAND 2300 to the DRAM 2200 when the vehicle 200 exits a parking mode and is driven so that the DRAM 2200 may return to a state prior to self-refresh being stopped. Accordingly, the user of the vehicle 200 may use the vehicle 200 in the same state as before it entered the parking mode of the vehicle 200.

Figure 9:
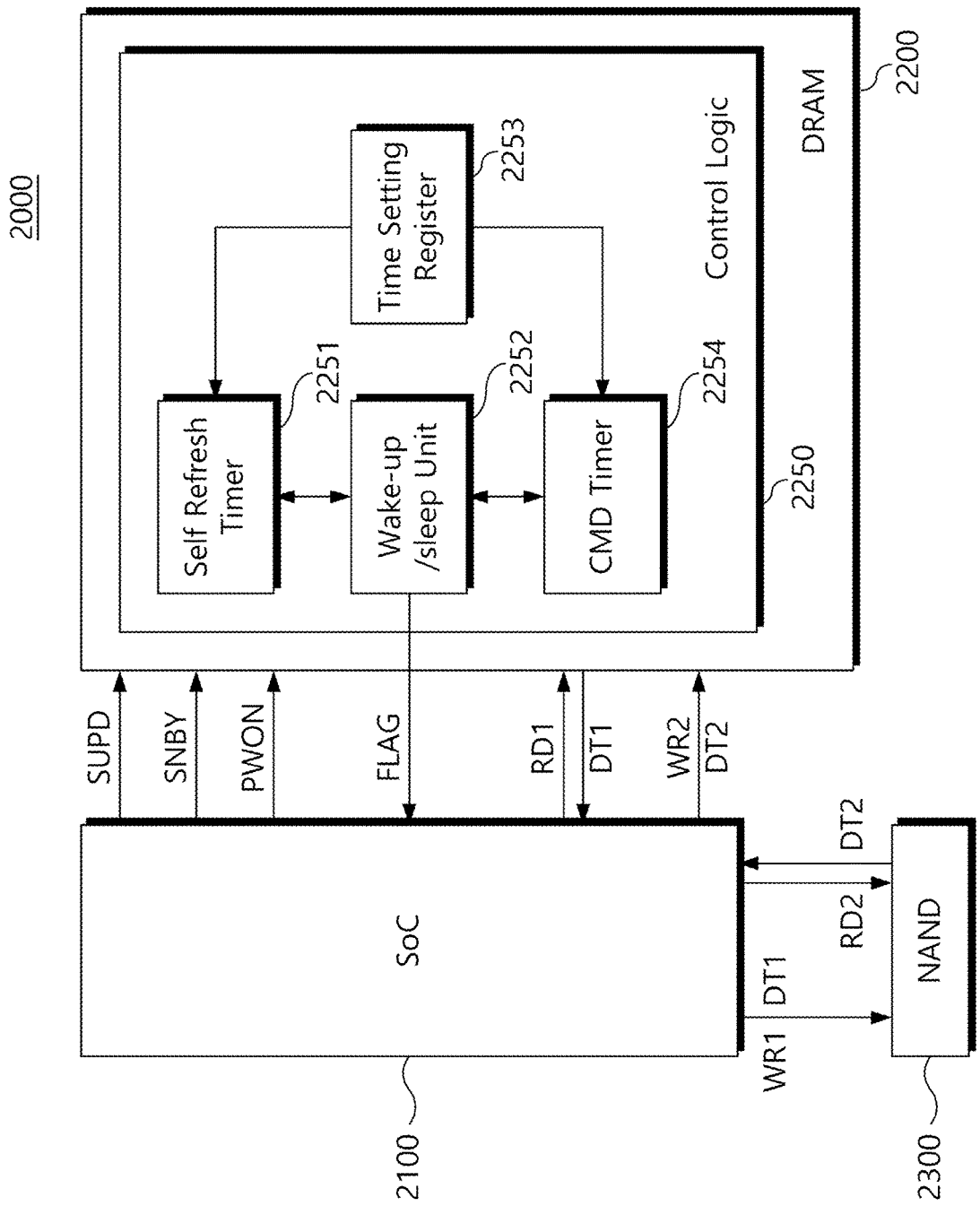
FIG. 9 is a block diagram illustrating a standby power reduction operation of a vehicle memory system of FIG. 8.

FIG. 9 is a block diagram illustrating the vehicle memory system 2000 of FIG. 8 as it is used in a standby power reduction operation of a vehicle memory system of FIG. 8. Referring to FIG. 9, a vehicle memory system 2000 may include a system on chip (SoC) 2100. The vehicle memory system 2000 may reduce standby power of the vehicle 200 by reducing the self-refresh time of the DRAM 2200 in the parking mode of the vehicle 200 of FIG. 8. A control logic 2250 of the DRAM 2200 may include a self-refresh timer 2251, a wake-up/sleep unit 2252, a time setting register 2253, and a command timer 2254.

According to an example embodiment, when receiving a standby command SUPD, the DRAM 2200 may enter a self-refresh mode. For example, when the vehicle 200 enters the parking mode, the system on chip 2100 may transmit the standby command SUPD to the DRAM 2200. When receiving the standby command SUPD, the DRAM 2200 may enter a self-refresh mode. As an example, when receiving the standby command SUPD, the wake-up/sleep unit 2252 may cause the DRAM 2200 to operate in a self-refresh mode and transmit a first timer start signal to the self-refresh timer 2251. In the self-refresh mode, the DRAM 2200 may periodically perform self-refresh.

According to an example embodiment, when receiving the standby command SUPD, the DRAM 2200 may count a specified time. For example, when receiving the standby command SUPD, the self-refresh timer 2251 may count a first time period. The time setting register 2253 may store the first time period. The first time period may be set by a user. The self-refresh timer 2251 may start counting when receiving information of the first time period from the time setting register 2253.

According to an example embodiment, when the first time period elapses, the DRAM 2200 may enter a standby mode. For example, the self-refresh timer 2251 may transmit a first time-elapsed signal to the wake-up/sleep unit 2252 when the first time period elapses. When receiving the first time-elapsed signal, the wake-up/sleep unit 2252 may enter the standby mode in which it is capable of receiving a command from the system on chip 2100. In addition, when receiving the first time-elapsed signal, the wake-up/sleep unit 2252 may transmit a flag FLAG to the system on chip 2100.

According to an example embodiment, when the system on chip 2100 receives the flag FLAG, the vehicle memory system 2000 may back up data stored in the DRAM 2200 to the NAND 2300. For example, when receiving the flag FLAG, the system on chip 2100 may transmit a first read command RD1 to the DRAM 2200. As an example, the first read command RD1 may include at least one read command based on a size of data stored in the DRAM 2200. The DRAM 2200 may transmit first data DT1 to the system on chip 2100 in response to the first read command RD1. The system on chip 2100 may transmit a first write command WR1 together with the first data DT1 to the NAND 2300.

According to an example embodiment, when backing up the first data DT1, the DRAM 2200 may count a specified time. For example, when no more commands are received from the system on chip 2100, the command timer 2254 may count a second time period. As an example, the command timer 2254 may count the second time period from a point at which a transmission of the first data DT1 is completed. As another example, the command timer 2254 may count the second time period from a reception point of the first read command RD1. When the first read command RD1 includes a plurality of read commands, the command timer 2254 may count the second time period from a reception point of the last read command. The time setting register 2253 may store the second time period. The second time period may be set by a user. The command timer 2254 may start counting when receiving information of the second time period from the time setting register 2253.

According to an example embodiment, when the second time period elapses, the DRAM 2200 may enter a power-off mode. For example, the command timer 2254 may transmit a second time-elapsed signal to the wake-up/sleep unit 2252 when the second time period elapses. When receiving the second time-elapsed signal, the wake-up/sleep unit 2252 may cut off power to the DRAM 2200. In the power-off mode, the DRAM 2200 may not even perform a self-refresh operation. Accordingly, a current (for example, IDD6) consumed for the self-refresh operation is reduced, and standby power of the vehicle 200 may be reduced during the parking mode of the vehicle 200.

According to an example embodiment, when a specified condition (for example, unlocking a door or opening a door) is satisfied, the vehicle memory system 2000 may change the DRAM 2200 from the power-off mode to the standby mode. For example, when an unlocking or opening of a door of the vehicle 200 is sensed, the system on chip 2100 may transmit a standby command SNBY to the DRAM 2200. When the standby command SNBY is received, the wake-up/sleep unit 2252 may enter the standby mode capable of receiving a command from the system on chip 2100.

According to an example embodiment, the vehicle memory system 2000 may restore data of the DRAM 2200 to a state prior to the power-off mode. For example, the system on chip 2100 may transmit a second read command RD2 to the NAND 2300. The NAND 2300 may transmit second data DT2 to the system on chip 2100 in response to the second read command RD2. As an example, the second data DT2 may be identical to the first data DT1. Alternatively, the second data DT2 may include the first data DT1. The system on chip 2100 may transmit a second write command WR2 together with the second data DT2 to the DRAM 2200. The DRAM 2200 may store the second data DT2 and restore a state prior to the power-off mode.

According to an example embodiment, when the vehicle 200 is started, the vehicle memory system 2000 may activate the DRAM 2200. For example, when the vehicle 200 is started, the DRAM 2200 may enter an operating mode. Since data prior to the power-off mode is restored in the DRAM 2200, a user of the vehicle 200 may use the vehicle 200 without delay.

Figure 10:
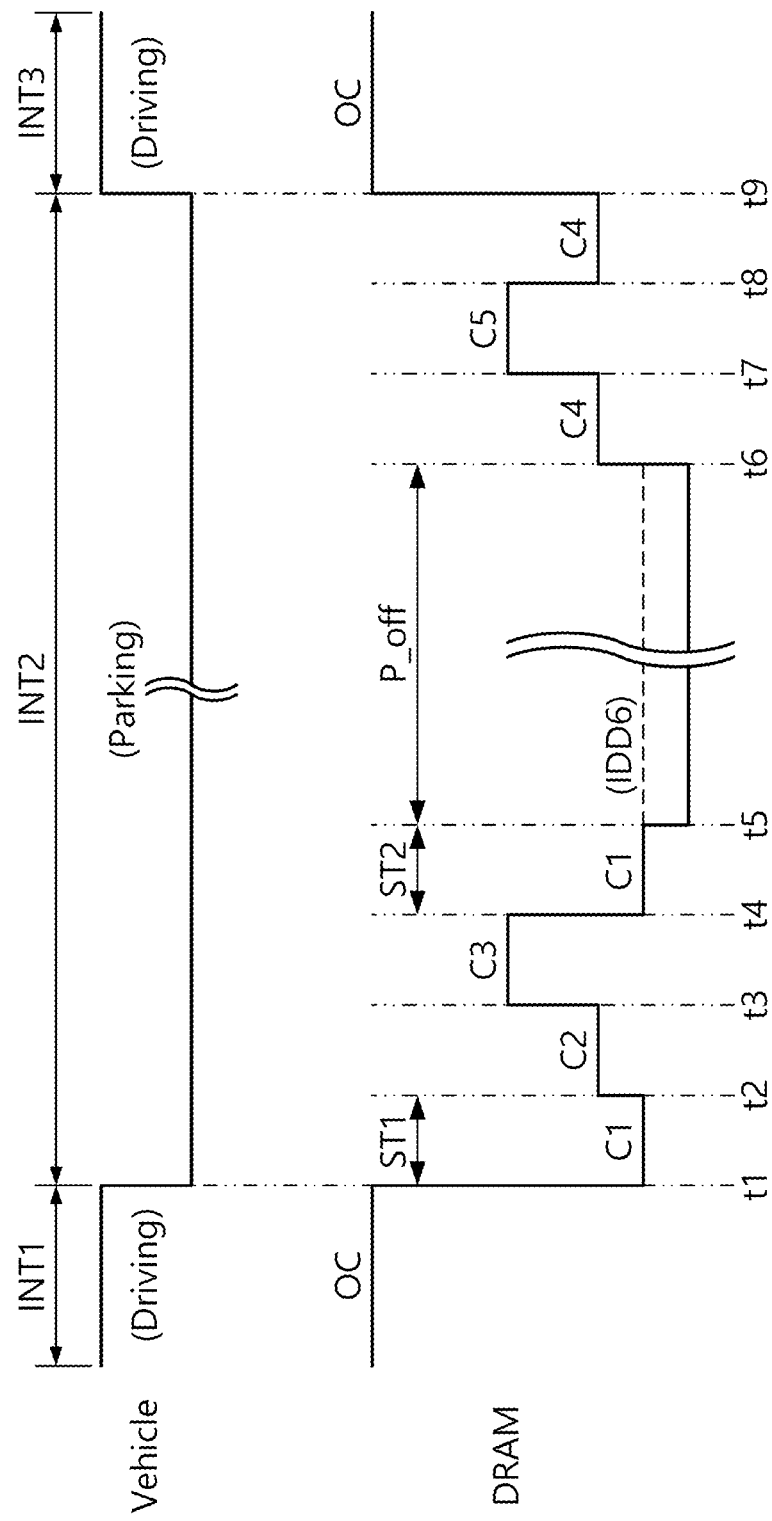
FIG. 10 is a timing diagram illustrating changes in current used in a volatile memory device of FIG. 9.

FIG. 10 is a timing diagram illustrating changes in current used in a volatile memory device of FIG. 9. Referring to FIGS. 9 and 10, when the vehicle 200 is in a duty off state, the DRAM 2200 may reduce a current consumed for self-refresh operation, thereby reducing a standby power of the vehicle 200. In a first period INT1 and a third period INT3 (for example, a period in which the vehicle 200 is used, or when the vehicle 200 is on duty), an operating current OC may be consumed on the DRAM 2200. In the second period INT2 (for example, a period in which the vehicle 200 is in a parking mode, or a case in which the vehicle 200 is in a duty off state), standby currents C1, C2, C3, C4 and C5 may be consumed on the DRAM 2200.

According to an example embodiment, at a first time point t1, the state of the vehicle 200 may change from a driving mode to a parking mode. For example, when the vehicle 200 enters the parking mode, the system on chip 2100 may transmit a standby command SUPD to the DRAM 2200. When receiving the standby command SUPD, the DRAM 2200 may enter a self-refresh mode. In the self-refresh mode, the DRAM 2200 may consume the first standby current C1 (for example, IDD6). The self-refresh timer 2251 may count a first time period ST1.

According to an example embodiment, at a second time point t2, the DRAM 2200 may enter a standby mode. For example, the self-refresh timer 2251 may transmit a first time-elapsed signal to the wake-up/sleep unit 2252 when the first time period ST1 elapses. When receiving the first time-elapsed signal, the wake-up/sleep unit 2252 may enter a standby mode capable of receiving a command from the system on chip 2100. In the standby mode, the DRAM 2200 may consume the second standby current C2. In addition, when receiving the first time-elapsed signal, the wake-up/sleep unit 2252 may transmit a flag FLAG to the system on chip 2100.

According to an example embodiment, at a third time point t3, the vehicle memory system 2000 may back up data stored in the DRAM 2200 to the NAND 2300. For example, when receiving the flag FLAG, the system on chip 2100 may transmit a first read command RD1 to the DRAM 2200. The DRAM 2200 may transmit first data DT1 to the system on chip 2100 in response to the first read command RD1. When the first data DT1 is transmitted to the system on chip 2100 in response to the first read command RD1, the DRAM 2200 may consume the third standby current C3.

According to an example embodiment, at a fourth point in time t4, the DRAM 2200 may count a specified time. For example, when no more commands are received from the system on chip 2100, the command timer 2254 may count a second time period ST2. For example, the command timer 2254 may count the second time period ST2 from a point at which the transmission of the first data DT1 is completed. As another example, the command timer 2254 may count the second time period ST2 from a reception point of the first read command RD1. When the first read command RD1 includes a plurality of read commands, the command timer 2254 may count the second time period ST2 from a reception point of the last read command. And then, by entering the self-refresh mode again, the DRAM 2200 may consume the first standby current C1 (for example, IDD6).

According to an example embodiment, at a fifth point in time t5, the DRAM 2200 may enter a power-off mode. For example, the command timer 2254 may transmit a second time-elapsed signal to the wake-up/sleep unit 2252 when the second time period ST2 elapses. When receiving the second time-elapsed signal, the wake-up/sleep unit 2252 may cut off power to the DRAM 2200. During a power-off period P_off, the DRAM 2200 may not even perform a self-refresh operation. Accordingly, a current (for example, IDD6) consumed for the self-refresh operation is reduced, and standby power of the vehicle 200 may be reduced (i.e., stopped) during the parking mode period of the vehicle 200.

According to an example embodiment, at a sixth time point t6, when a specified condition (for example, unlocking a door or opening a door) is satisfied, the vehicle memory system 2000 may change the DRAM 2200 from the power-off mode to the standby mode. For example, when unlocking or opening a door of the vehicle 200 is sensed, the system on chip 2100 may transmit a standby command SNBY to the DRAM 2200. When the standby command SNBY is received, the wake-up/sleep unit 2252 may enter the standby mode capable of receiving a command from the system on chip 2100. In the standby mode, the DRAM 2200 may consume the fourth standby current C4. As an example, the fourth standby current C4 may be equal to the second standby current C2. As another example, the fourth standby current C4 may be different from the second standby current C2.

According to an example embodiment, at a seventh point in time t7, data of the DRAM 2200 may be restored. For example, the system on chip 2100 may transmit a second read command RD2 to the NAND 2300. The NAND 2300 may transmit second data DT2 to the system on chip 2100 in response to the second read command RD2. As an example, the second data DT2 may be identical to the first data DT1. Alternatively, the second data DT2 may include the first data DT1. The system on chip 2100 may transmit a second write command WR2 together with the second data DT2 to the DRAM 2200. The DRAM 2200 may perform a write operation of the second data DT2 and restore a state prior to the power-off mode. When performing the write operation of the second data DT2, the DRAM 2200 may consume the fifth standby current C5.

According to an example embodiment, at an eighth point in time t8, when the write operation of the second data DT2 is completed, the DRAM 2200 may be maintained in a standby mode. For example, while the standby mode is maintained, the DRAM 2200 may consume the fourth standby current C4.

According to an example embodiment, at a ninth time point t9, when the vehicle 200 is started, the vehicle memory system 2000 may activate the DRAM 2200. For example, when the vehicle 200 is started, the DRAM 2200 may enter an operating mode. Since data prior to the power-off mode is restored in the DRAM 2200, the user of the vehicle 200 may use the vehicle 200 without delay. In the operating mode, the DRAM 2200 may consume operating current OC.

Figure 11:
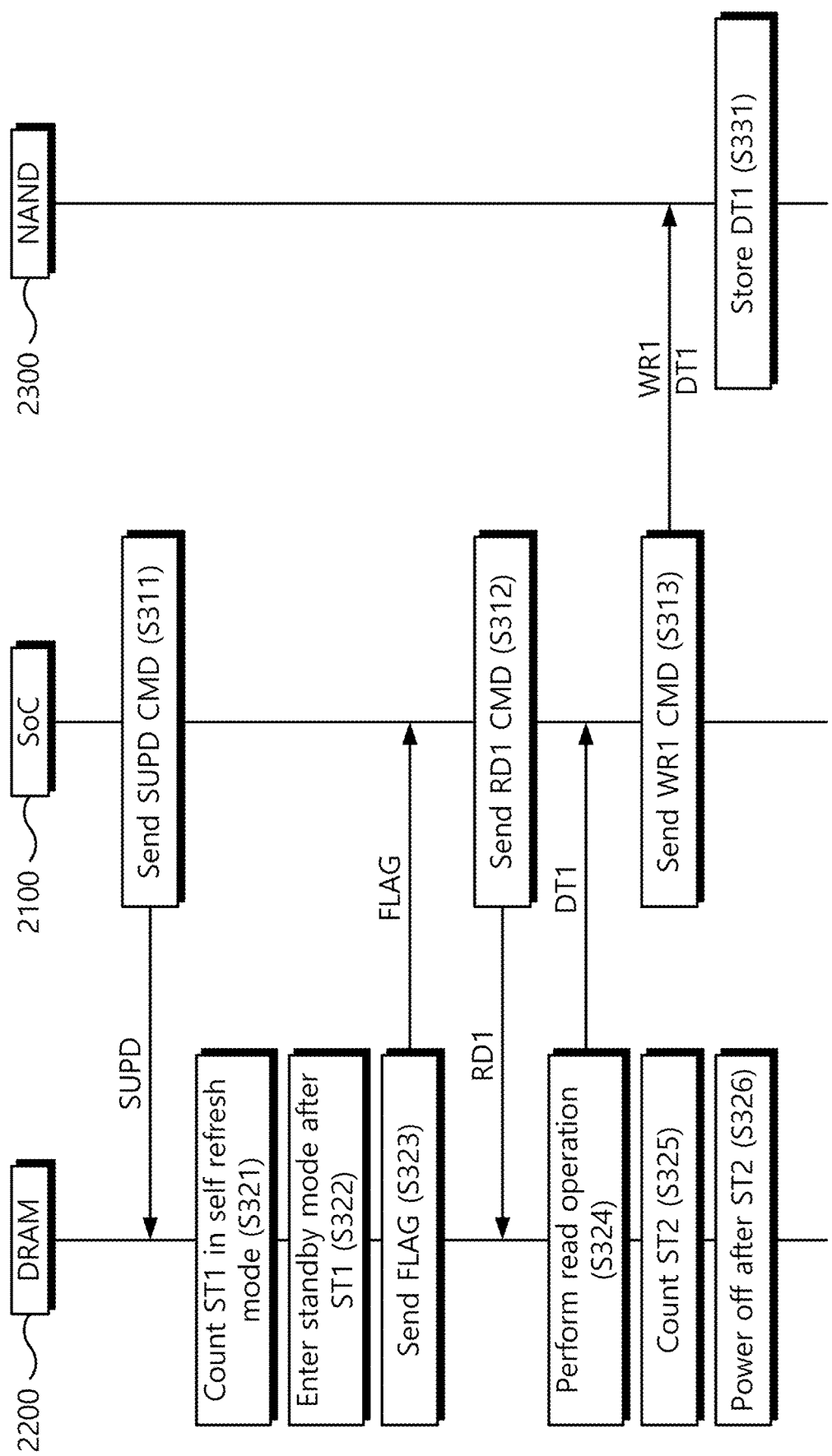
FIG. 11 is a flowchart illustrating a data backup operation according to a standby power reduction method of the vehicle memory system of FIG. 9.

FIG. 11 is a flowchart illustrating a data backup operation according to a standby power reduction method of the vehicle memory system of FIG. 9. Referring to FIGS. 9 to 11, the vehicle memory system 2000 may reduce a standby power of the vehicle 200 of FIG. 8 by reducing the self-refresh time of the DRAM 2200 in the parking mode of the vehicle 200.

According to an example embodiment, in operation S311, the system on chip 2100 may transmit a standby command SUPD to the DRAM 2200. For example, when the vehicle 200 enters the parking mode, the system on chip 2100 may transmit a standby command SUPD to the DRAM 2200.

According to an example embodiment, in operation S321, the DRAM 2200 may count a first time period ST1 in a self-refresh mode. For example, when receiving the standby command SUPD, the DRAM 2200 may enter the self-refresh mode. As an example, when receiving the standby command SUPD, the wake-up/sleep unit 2252 may cause the DRAM 2200 to operate in the self-refresh mode and transmit a first timer start signal to the self-refresh timer 2251. In the self-refresh mode, the DRAM 2200 may periodically perform self-refresh. When receiving the first timer start signal, the self-refresh timer 2251 may count the first time period ST1.

According to an example embodiment, in operation S322, when the first time period ST1 elapses, the DRAM 2200 may enter a standby mode. For example, the self-refresh timer 2251 may transmit a first time-elapsed signal to the wake-up/sleep unit 2252 when the first time period ST1 elapses. When receiving the first time-elapsed signal, the wake-up/sleep unit 2252 may enter a standby mode capable of receiving a command from the system on chip 2100.

According to an example embodiment, in operation S323, when the first time period ST1 elapses, the DRAM 2200 may transmit a flag FLAG to the system on chip 2100. For example, when receiving the first time-elapsed signal, the wake-up/sleep unit 2252 may transmit the flag FLAG to the system on chip 2100.

According to an example embodiment, in operation S312, when receiving the flag FLAG, the system on chip 2100 may transmit a first read command RD1 to the DRAM 2200. For example, the first read command RD1 may include at least one read command based on a size of data stored in the DRAM 2200.

According to an example embodiment, in operation S324, the DRAM 2200 may perform a read operation based on the first read command RD1. For example, the DRAM 2200 may transmit first data DT1 to the system on chip 2100 in response to the first read command RD1.

According to an example embodiment, in operation S325, the DRAM 2200 may count a second time period ST2. For example, when no more commands are received from the system on chip 2100, the command timer 2254 may count the second time period ST2. As an example, the command timer 2254 may count the second time period ST2 from a point at which the transmission of the first data DT1 is completed. As another example, the command timer 2254 may count the second time period ST2 from a time point at which the first read command RD1 is received. When the first read command RD1 includes a plurality of read commands, the command timer 2254 may count the second time period ST2 from a reception point of the last read command.

According to an example embodiment, in operation S326, when the second time period ST2 elapses, the DRAM 2200 may enter a power-off mode. For example, the command timer 2254 may transmit a second time-elapsed signal to the wake-up/sleep unit 2252 when the second time period ST2 elapses. When receiving the second time-elapsed signal, the wake-up/sleep unit 2252 may cut off power to the DRAM 2200. In the power-off mode, the DRAM 2200 may not even perform a self-refresh operation. Accordingly, a current (for example, IDD6) consumed for the self-refresh operation is reduced, and standby power of the vehicle 200 may be reduced during the parking mode period of the vehicle 200.

According to an example embodiment, in operation S313, the system on chip 2100 may transmit a first write command WR1 together with the first data DT1 to the NAND 2300.

According to an example embodiment, in operation S331, the NAND 2300 may store first data DT1. For example, the NAND 2300 may perform a write operation of the first data DT1. The write operation of the first data DT1 may be performed regardless of an operation of the DRAM 2200.

Figure 12:
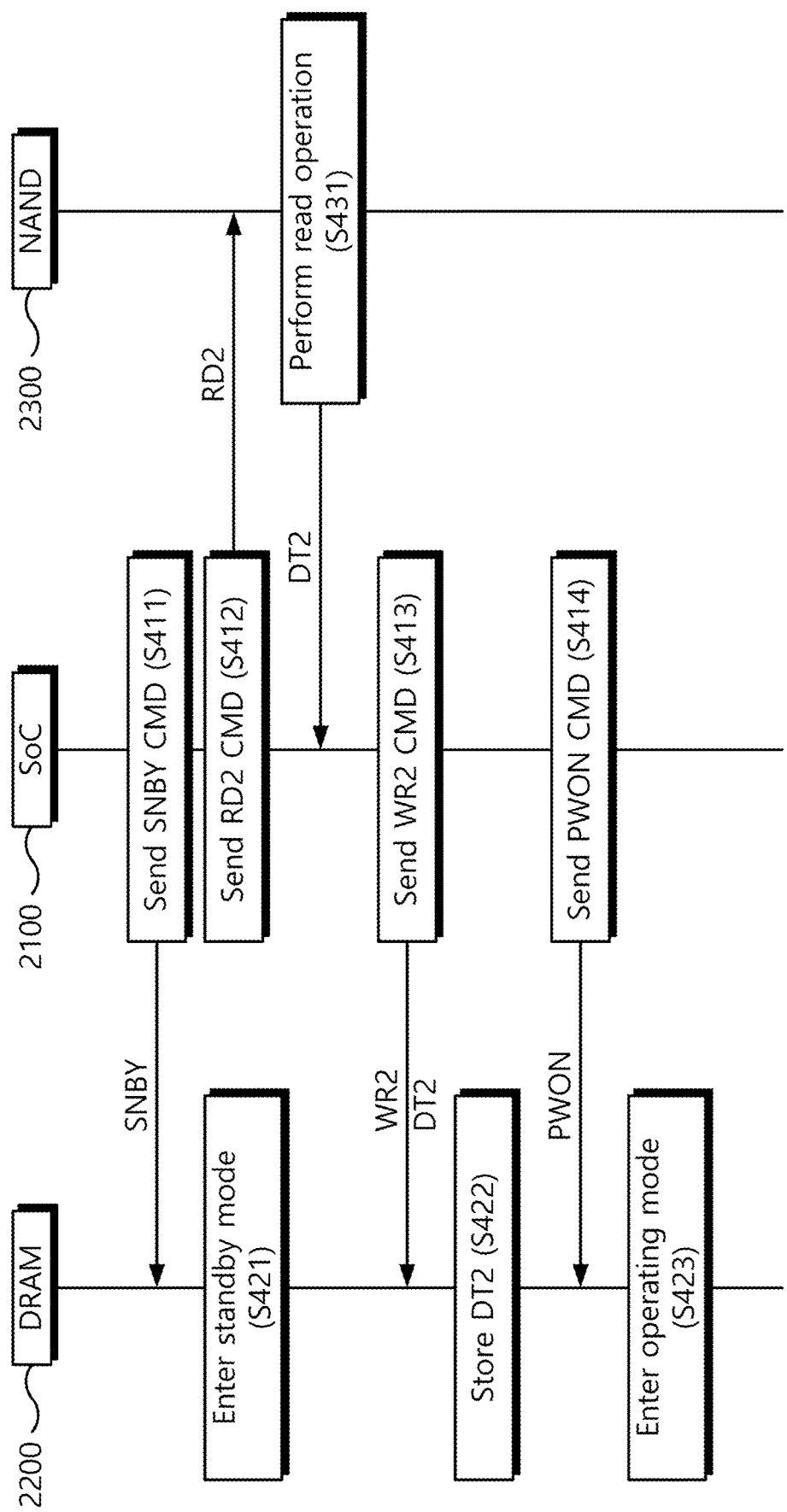
FIG. 12 is a flowchart illustrating a data recovery operation according to the standby power reduction method of the vehicle memory system of FIG. 9.

FIG. 12 is a flowchart illustrating a data recovery operation according to the standby power reduction method of the vehicle memory system of FIG. 9. Referring to FIGS. 9 to 12, the vehicle memory system 2000 may restore data of the DRAM 2200 when the vehicle 200 of FIG. 8 is restarted to shorten a delay during a re-operation of the vehicle 200.

According to an example embodiment, in operation S411, when a specified condition (for example, unlocking a door or opening a door) is satisfied, the system on chip 2100 may transmit a standby command SNBY to the DRAM 2200. For example, when unlocking or opening a door of the vehicle 200 is sensed, the system on chip 2100 may transmit the standby command SNBY.

According to an example embodiment, in operation S421, the DRAM 2200 may enter a standby mode. For example, when a standby command SNBY is received, the wake-up/sleep unit 2252 may enter the DRAM 2200 into a standby mode capable of receiving a command from the system on chip 2100.

According to an example embodiment, in operation S412, the system on chip 2100 may transmit a second read command RD2 to the NAND 2300. In operation S431, the NAND 2300 may transmit second data DT2 to the system on chip 2100 in response to the second read command RD2.

According to an example embodiment, in operation S413, the system on chip 2100 may transmit a second write command WR2 together with the second data DT2 to the DRAM 2200. In operation S422, the DRAM 2200 may store second data DT2. Accordingly, the DRAM 2200 may be restored to a state prior to the power-off mode. The DRAM 2200 may stand by in the standby mode.

According to an example embodiment, in operation S414, when the vehicle 200 is started, the system on chip 2100 may transmit a power-on command PWON to the DRAM 2200. In operation S423, when receiving the power-on command PWON, the DRAM 2200 may enter an operating mode. In the DRAM 2200, data prior to the power-off mode is restored in operation S422, so that a user of the vehicle 200 may use the vehicle 200 without delay.

Figure 13:
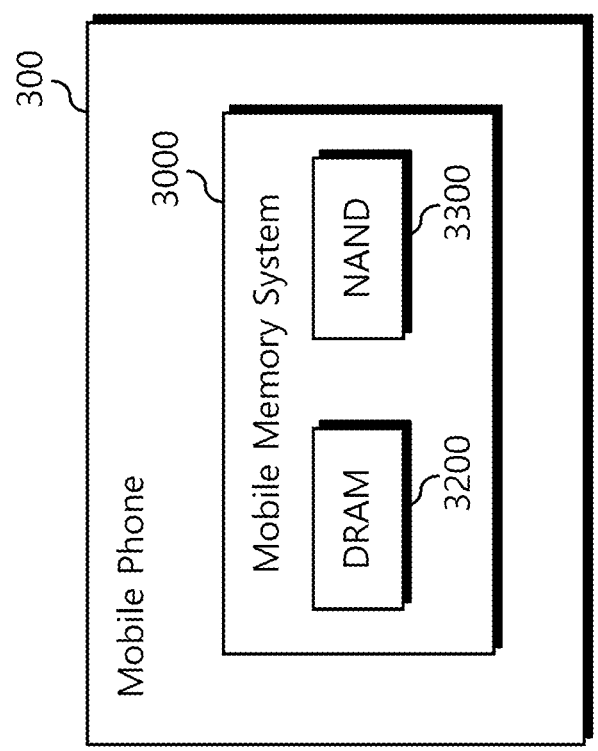
FIG. 13 is a block diagram illustrating a mobile phone according to an example embodiment.

FIG. 13 is a block diagram illustrating a mobile phone according to an example embodiment. Referring to FIG. 13, a mobile phone 300 may include a mobile memory system 3000. The mobile memory system 3000 may store data for driving the mobile phone 300. The mobile memory system 3000 may include a DRAM 3200 and a NAND 3300.

According to an example embodiment, the DRAM 3200 has high reading and writing speeds, but contents stored in the DRAM 3200 may disappear when power supply is interrupted. Contents stored in the NAND 3300 may be preserved even when power supply is interrupted. For example, the mobile memory system 3000 may store main data in the NAND 3300. The mobile memory system 3000 may load data necessary for an operation of the mobile phone 300 into the DRAM 3200. The loaded data may be used for the operation of the mobile phone 300. The mobile memory system 3000 may back up data used for operation of the mobile phone 300 from the DRAM 3200 to the NAND 3300.

According to an example embodiment, the mobile memory system 3000 may maintain data of the DRAM 3200 even in a specified state (for example, a locked state) of the mobile phone 300. For example, in the specified state of the mobile phone 300, the DRAM 3200 may enter a self-refresh mode and continuously perform self-refresh. If self-refresh is continuously performed even during the specified state of the mobile phone 300, data stored in the DRAM 3200 may be maintained. However, if self-refresh is continuously performed, power consumption of the mobile phone 300 may continue even during the specified state of the mobile phone 300.

According to an example embodiment, the mobile memory system 3000 may reduce power consumption caused by continuous self-refresh. For example, the mobile memory system 3000 may transmit data stored in the DRAM 3200 to the NAND 3300 and stop self-refresh when a specified condition is satisfied after the mobile phone 300 is in the specified state. In addition, when the mobile phone 300 is unlocked, the mobile memory system 3000 restores the data stored in the NAND 3300 back to the DRAM 3200 to return the DRAM 3200 to a state prior to self-refresh being interrupted. Accordingly, a user of the mobile phone 300 may use the mobile phone 300 in the same state as a state prior to the specified state of the mobile phone 300.

Figure 14:
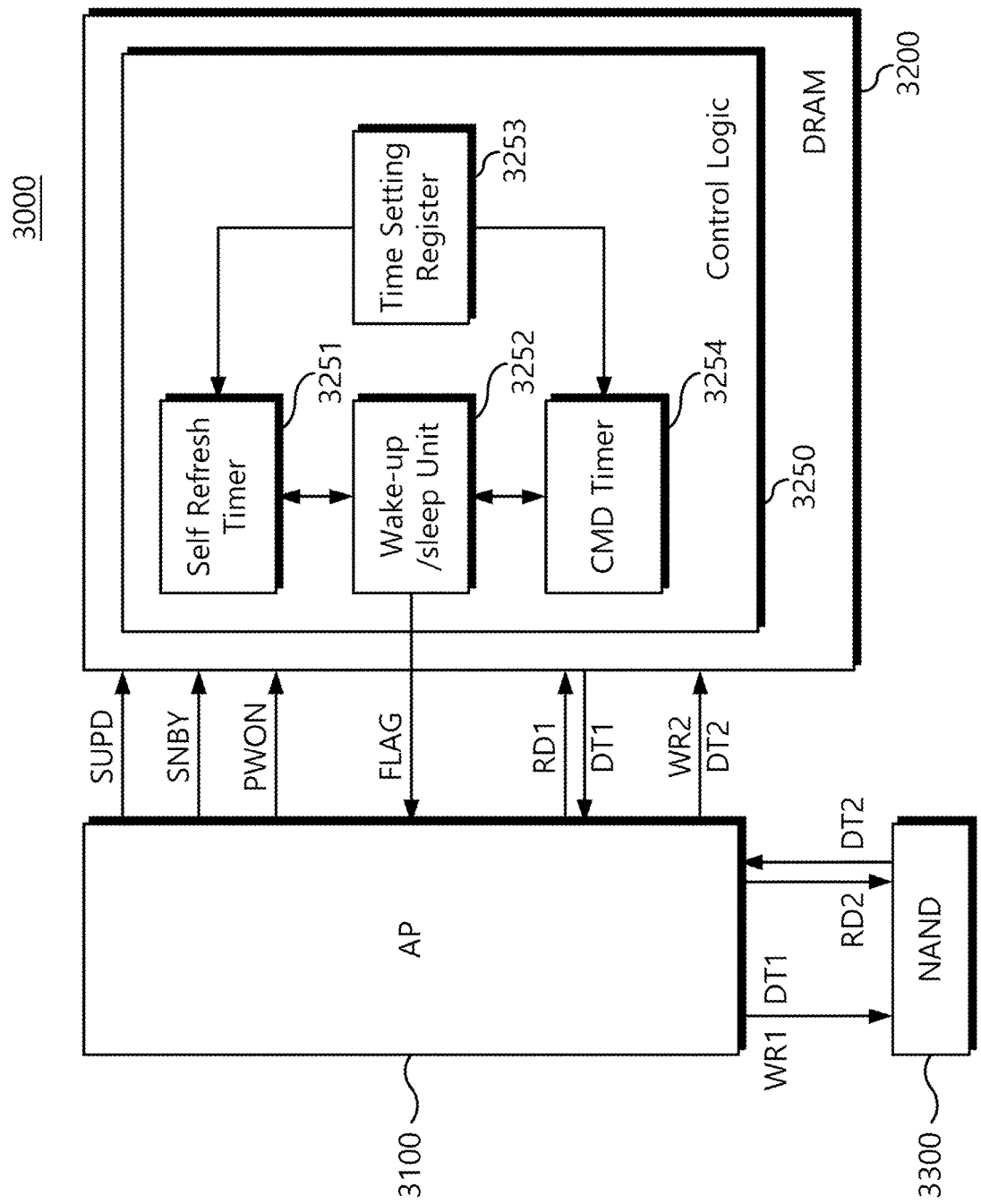
FIG. 14 is a block diagram illustrating a standby power reduction operation of the mobile memory system of FIG. 13.

FIG. 14 is a block diagram illustrating the mobile memory system 3000 of FIG. 13 as it is used in a standby power reduction operation of the mobile memory system of FIG. 13. Referring to FIG. 14, a mobile memory system 3000 may include an application processor (AP) 3100. The mobile memory system 3000 may reduce standby power of the mobile phone 300 by reducing a self-refresh time of the DRAM 3200 in a specified state of the mobile phone 300 of FIG. 13. A control logic 3250 of the DRAM 3200 may include a self-refresh timer 3251, a wake-up/sleep unit 3252, a time setting register 3253, and a command timer 3254.

According to an example embodiment, when receiving a standby command SUPD, the DRAM 3200 may enter a self-refresh mode. For example, when the mobile phone 300 enters an idle mode (for example, when a display of the mobile phone 300 is turned off, or when the mobile phone 300 is locked), the AP 3100 may transmit a standby command SUPD to the DRAM 3200. When receiving the standby command SUPD, the DRAM 3200 may enter a self-refresh mode. For example, when receiving the standby command SUPD, the wake-up/sleep unit 3252 may cause the DRAM 3200 to operate in a self-refresh mode and transmit a first timer start signal to the self-refresh timer 3251. In the self-refresh mode, the DRAM 3200 may periodically perform self-refresh.

According to an example embodiment, when receiving the standby command SUPD, the DRAM 3200 may count a specified time. For example, when receiving the standby command SUPD, the self-refresh timer 3251 may count a first time period. The time setting register 3253 may store the first time period. The first time period may be set by a user. The self-refresh timer 3251 may start counting when receiving information of the first time period from the time setting register 3253.

According to an example embodiment, when the first time period elapses, the DRAM 3200 may enter a standby mode. For example, the self-refresh timer 3251 may transmit a first time-elapsed signal to the wake-up/sleep unit 3252 when the first time period elapses. When receiving the first time-elapsed signal, the wake-up/sleep unit 3252 may enter the standby mode capable of receiving a command from the AP 3100. In addition, when receiving the first time-elapsed signal, the wake-up/sleep unit 3252 may transmit a flag FLAG to the AP 3100.

According to an example embodiment, when the AP 3100 receives the flag FLAG, the mobile memory system 3000 may back up data stored in the DRAM 3200 to the NAND 3300. For example, when receiving the flag FLAG, the AP 3100 may transmit a first read command RD1 to the DRAM 3200. As an example, the first read command RD1 may include at least one read command based on a size of the data stored in the DRAM 3200. The DRAM 3200 may transmit a first data DT1 to the AP 3100 in response to the first read command RD1. The AP 3100 may transmit a first write command WR1 together with the first data DT1 to the NAND 3300.

According to an example embodiment, when backing up the first data DT1, the DRAM 3200 may count a specified time. For example, when no more commands are received from the AP 3100, the command timer 3254 may count a second time period. As an example, the command timer 3254 may count the second time period from a point at which a transmission of the first data DT1 is completed. As another example, the command timer 3254 may count the second time period from a time point at which the first read command RD1 is received. When the first read command RD1 includes a plurality of read commands, the command timer 3254 may count the second time period from a reception point of the last read command. The time setting register 3253 may store the second time period. The second time period may be set by a user. The command timer 3254 may start counting when receiving information of the second time period from the time setting register 3253.

According to an example embodiment, when the second time period elapses, the DRAM 3200 may enter a power-off mode. For example, the command timer 3254 may transmit a second time-elapsed signal to the wake-up/sleep unit 3252 when the second time period elapses. When receiving the second time-elapsed signal, the wake-up/sleep unit 3252 may cut off power to the DRAM 3200. In the power-off mode, the DRAM 3200 may not even perform a self-refresh operation. Accordingly, a current (for example, IDD6) consumed for the self-refresh operation is reduced (i.e., stopped), and standby power of the mobile phone 300 may be reduced during the idle state period of the mobile phone 300.

According to an example embodiment, when a specified condition (for example, motion detection or a button click) is satisfied, the mobile memory system 3000 may change the DRAM 3200 from the power-off mode to the standby mode. For example, when an operation of the mobile phone 300 is detected or a button is clicked, the AP 3100 may transmit a standby command SNBY to the DRAM 3200. When the standby command SNBY is received, the wake-up/sleep unit 3252 may enter the standby mode capable of receiving a command from the AP 3100.

According to an example embodiment, the mobile memory system 3000 may restore data of the DRAM 3200 to a state prior to the power-off mode. For example, the AP 3100 may transmit a second read command RD2 to the NAND 3300. The NAND 3300 may transmit second data DT2 to the AP 3100 in response to the second read command RD2. As an example, the second data DT2 may be identical to the first data DT1. Alternatively, the second data DT2 may include the first data DT1. The AP 3100 may transmit a second write command WR2 together with the second data DT2 to the DRAM 3200. The DRAM 3200 may store the second data DT2 and restore a state prior to the power-off mode.

According to an example embodiment, when the mobile phone 300 is unlocked, the mobile memory system 3000 may activate the DRAM 3200. For example, when the mobile phone 300 is unlocked, the DRAM 3200 may enter an operating mode. Since data prior to the power-off mode is restored to the DRAM 3200, a user of the mobile phone 300 may use the mobile phone 300 without delay.

According to the present disclosure, standby power of the host device (for example, a vehicle or a mobile phone) may be reduced by reducing the self-refresh current of the volatile memory device when the host device is in a duty off state.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory system included in a host device, the memory system comprising:
    a volatile memory device configured to perform self-refresh in a self-refresh mode based on the host device changing from an on-duty state to an off-duty state, the volatile memory device being configured to count, in the self-refresh mode, a first time period based on the host device being in the off-duty state;
    a non-volatile memory device; and
    a processor configured to control a read operation or a write operation of the volatile memory device and the non-volatile memory device,
    wherein the processor is configured to back up data stored in the volatile memory device to the non-volatile memory device based on the volatile memory device being in the self-refresh mode and after the first time period has elapsed subsequent to the host device being in the off-duty state,
    wherein the volatile memory device is configured to transmit a flag based on the first time period elapsing, transmit data stored in the volatile memory device that is included in the memory system based on a read command corresponding to the flag, count a second time period subsequent to transmission of the data being completed, and stop the self-refresh after the second time period elapses.

2. The memory system as claimed in claim 1, wherein the processor is configured to transmit a standby command to the volatile memory device based on detecting that the host device is in the off-duty state, and transmit a first read command to the volatile memory device based on the flag being received from the volatile memory device subsequent to the first time period elapsing from a transmission point of the standby command.

3. The memory system as claimed in claim 2, wherein the volatile memory device is configured to enter the self-refresh mode based on receiving the standby command.

4. The memory system as claimed in claim 2, wherein the volatile memory device comprises a self-refresh timer configured to count the first time period from the transmission point of the standby command.

5. The memory system as claimed in claim 4, wherein the volatile memory device comprises a wake-up/sleep unit configured to activate the self-refresh timer based on receiving the standby command, and the wake-up/sleep unit is configured to generate the flag based on receiving a first time elapsed signal from the self-refresh timer subsequent to the first time period elapsing.

6. The memory system as claimed in claim 2, wherein the volatile memory device is configured to transmit the data stored in the volatile memory device to the processor in response to the first read command.

7. The memory system as claimed in claim 6, wherein the volatile memory device comprises a command timer configured to count the second time period from a time point based on transmission of the data stored in the volatile memory device being completed.

8. The memory system as claimed in claim 2, wherein the volatile memory device comprises a wake-up/sleep unit configured to activate a command timer based on transmission of the data stored in the volatile memory device being completed, and the wake-up/sleep unit is configured to control the volatile memory device to enter a power-off mode based on a second time elapsed signal being received from the command timer subsequent to the second time period elapsing.

9. The memory system as claimed in claim 1, wherein the volatile memory device comprises a time setting register storing the first time period and the second time period.

10. The memory system as claimed in claim 1, wherein the processor is configured to move data from the non-volatile memory device to the volatile memory device based on a preliminary operation in which the on-duty state of the host device being sensed.

11. The memory system as claimed in claim 10, wherein the volatile memory device is configured to be switched from a power-off mode to a standby mode based on a standby command being received from the processor, and to store the data from the non-volatile memory device based on a write command being received.

12. A method of reducing standby power of a memory system included in a host device, the method comprising:
    receiving a standby command based on detecting that the host device is in an off-duty mode;
    counting, by a volatile memory device performing self-refresh in a self-refresh mode, a first time period based on the standby command;
    transmitting a flag based on the first time period elapsing;
    transmitting data stored in the volatile memory device which is included in the memory system based on a read command corresponding to the flag;
    counting a second time period subsequent to transmission of the data being completed; and
    powering off the volatile memory device subsequent to the second time period elapsing.

13. The method as claimed in claim 12, wherein the receiving of the standby command is configured to include entering the self-refresh mode based on the standby command.

14. The method as claimed in claim 12, further comprising:
    entering a standby mode of the volatile memory device based on a preliminary operation in which an on-duty mode of the host device being sensed.

15. The method as claimed in claim 14, further comprising:
    storing the data again to the volatile memory device in the standby mode.

16. The method as claimed in claim 15, further comprising:
    switching an operation mode of the volatile memory device based on the host device being in the on-duty mode subsequent to the data being stored again to the volatile memory device.

17. A vehicle memory system included in a vehicle, the vehicle memory system comprising:
    a DRAM configured to perform self-refresh in a self-refresh mode based on a parking mode of the vehicle being detected, the DRAM being configured to count, in the self-refresh mode, a first time period;
    a NAND; and
    a system on chip configured to control a read operation or a write operation of the DRAM and the NAND, wherein the system on chip is configured to back up first data stored in the DRAM to the NAND based on the DRAM being in the self-refresh mode and on the first time period elapsing subsequent to the vehicle entering the parking mode, and wherein the DRAM is configured to transmit a flag based on the first time period elapsing, transmit the first data stored in the DRAM based on a read command corresponding to the flag, count a second time period subsequent to transmission of the first data being completed, and stop the self-refresh after the second time period elapses.

18. The vehicle memory system as claimed in claim 17, wherein the system on chip is configured to:

transmit a standby command to the DRAM based on the parking mode of the vehicle being detected, transmit the read command to the DRAM based on the flag being received from the DRAM subsequent to the first time period elapsing from a transmission point of the standby command, and restore second data from the NAND to the DRAM based on unlocking or opening of a door of the vehicle being sensed.

19. The vehicle memory system as claimed in claim 18, wherein the DRAM comprises:

a self-refresh timer configured to count the first time period from the transmission point of the standby command; and a wake-up/sleep unit configured to activate the self-refresh timer based on the standby command being received, wherein the wake-up/sleep unit is configured to generate the flag based on receiving a first time elapsed signal from the self-refresh timer subsequent to the first time period elapsing.

20. The vehicle memory system as claimed in claim 18, wherein the DRAM further comprises a command timer configured to count the second time period from a time point based on transmission of the first data stored in the DRAM being completed.

* * * * *